US012757136B2

(12) United States Patent
Ye et al.

(10) Patent No.: US 12,757,136 B2
(45) Date of Patent: Oct. 6, 2026

(54) METHOD AND SYSTEM TO SYNCHRONIZE RADIO DEVICE CLUSTERS IN A WIRELESS NETWORK

(71) Applicant: Red Point Positioning Corporation, Boston, MA (US)

(72) Inventors: Zhenzhen Ye, Westford, MA (US); Yongsen Ma, Malden, MA (US)

(73) Assignee: Red Point Positioning Corporation, Boston, MA (US)

( * ) Notice: Subject to any disclaimer, the term of this patent is extended or adjusted under 35 U.S.C. 154(b) by 857 days.

(21) Appl. No.: 17/851,202

(22) Filed: Jun. 28, 2022

(65) Prior Publication Data

US 2023/0422193 A1 Dec. 28, 2023

(51) Int. Cl.
*H04W 56/00* (2009.01)

(52) U.S. Cl.
CPC ............................... *H04W 56/0015* (2013.01)

(58) Field of Classification Search
None
See application file for complete search history.

(56) References Cited

U.S. PATENT DOCUMENTS 6,011,786 A 1/2000 Dent
8,923,141 B2 12/2014 Bryant et al.
9,942,118 B1 * 4/2018 Muhammad ........ H04L 41/0681
10,104,657 B2 10/2018 Otsu
2002/0018448 A1 2/2002 Amis et al.
2004/0264371 A1 * 12/2004 Chen ....................... H04L 47/22 370/229
2008/0165722 A1 7/2008 Zhang et al.
2009/0290572 A1 * 11/2009 Gonia ................... H04J 3/0641 370/350
2009/0296866 A1 * 12/2009 Hsieh ................ H04W 56/0045 375/371
2012/0225658 A1 9/2012 Oostveen et al.
(Continued)

FOREIGN PATENT DOCUMENTS

CN 109993338 B 8/2021
GB 2522200 A * 7/2015 .......... H04W 56/001

OTHER PUBLICATIONS

International Search Report and Written Opinion for PCT/US2022/014871 mailed May 3, 2022.
(Continued)

*Primary Examiner* — Nicholas Sloms
(74) *Attorney, Agent, or Firm* — Guntin & Gust, PLC; Robert Gingher

(57) ABSTRACT

Aspects of the subject disclosure may include, for example, a device having a processing system including a processor; and a memory that stores executable instructions that, when executed by the processing system, facilitate performance of operations including: determining that a first radio device in a first cluster is a neighbor of a boundary radio device in a second cluster of a wireless network; sending a first instruction to the boundary radio device to transmit first timestamp information received from a third radio device in the second cluster to the first radio device; and sending a second instruction to the first radio device to transmit the first timestamp information to radio devices in the first cluster. Other embodiments are disclosed.

20 Claims, 26 Drawing Sheets

670

(56) References Cited

U.S. PATENT DOCUMENTS

| | | | | |
|---|---|---|---|---|
| 2013/0038490 | A1* | 2/2013 | Garcia | G01S 13/74 342/451 |
| 2014/0206407 | A1 | 7/2014 | Kim et al. | |
| 2015/0036540 | A1* | 2/2015 | Kasslin | H04W 48/16 370/254 |
| 2015/0092552 | A1 | 4/2015 | Bajj et al. | |
| 2015/0156746 | A1* | 6/2015 | Horne | G01S 5/10 455/456.6 |
| 2015/0185309 | A1* | 7/2015 | Pu | H04W 64/003 455/456.1 |
| 2015/0341876 | A1 | 11/2015 | Abraham et al. | |
| 2016/0007310 | A1 | 1/2016 | et al. | |
| 2017/0026991 | A1* | 1/2017 | Oren | H04W 8/24 |
| 2017/0078897 | A1* | 3/2017 | Duan | H04W 24/02 |
| 2017/0366956 | A1* | 12/2017 | Yoshida | H04W 8/005 |
| 2019/0141645 | A1 | 5/2019 | Abouelseoud et al. | |
| 2019/0162438 | A1* | 5/2019 | Fokou | H04L 67/025 |
| 2019/0166572 | A1* | 5/2019 | Abraham | H04W 56/003 |
| 2019/0219665 | A1* | 7/2019 | Ye | G01S 5/10 |
| 2019/0356360 | A1* | 11/2019 | Van Meurs | H04B 7/024 |
| 2020/0036506 | A1* | 1/2020 | Tanwar | H04L 7/0033 |
| 2020/0137702 | A1* | 4/2020 | Patil | H04W 56/002 |
| 2020/0154473 | A1* | 5/2020 | Padaki | H04W 72/0446 |
| 2020/0382902 | A1* | 12/2020 | Ye | G01S 5/021 |
| 2021/0144517 | A1* | 5/2021 | Guim Bernat | H04L 47/781 |
| 2021/0344556 | A1* | 11/2021 | Zhao | H04L 41/082 |
| 2022/0255856 | A1* | 8/2022 | Barcaru | H04L 45/04 |
| 2023/0208856 | A1* | 6/2023 | Soryal | H04L 63/20 726/22 |

OTHER PUBLICATIONS

Pekhteryev, Georgiy et al., "Method and System To Synchronize Radio Devices in a Wireless Network", U.S. Appl. No. 17/181,286, filed Feb. 22, 2021.

* cited by examiner

300

600

620

640

Global adjacency matrix 645

| | A | ... | E | ... | G | ... |
|---|---|---|---|---|---|---|
| A | 0 | ... | ? | ... | ? | ... |
| ... | ... | ... | ... | ... | ... | ... |
| E | ? | ... | 0 | ... | ? | ... |
| ... | ... | ... | ... | ... | ... | ... |
| G | ? | ... | ? | ... | 0 | ... |
| ... | ... | ... | ... | ... | ... | ... |

Adjacency matrix after merging 647

| | A | ... | E | ... | G | ... |
|---|---|---|---|---|---|---|
| A | 0 | ... | 160 | ... | 0 | ... |
| ... | ... | ... | ... | ... | ... | ... |
| E | 140 | ... | 0 | ... | ? | ... |
| ... | ... | ... | ... | ... | ... | ... |
| G | 100 | ... | ? | ... | 0 | ... |
| ... | ... | ... | ... | ... | ... | ... |

670

680

700

METHOD AND SYSTEM TO SYNCHRONIZE RADIO DEVICE CLUSTERS IN A WIRELESS NETWORK

FIELD OF THE DISCLOSURE

The subject disclosure relates to a method and apparatus for synchronizing clocks of a cluster of radio devices in a wireless network.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, trajectory of objects, speed of objects, positions of objects, or combinations thereof. Accurate, synchronized local clocks are needed to perform such operations.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for synchronizing clocks for radio devices in clusters in a wireless network, so that locations of the radio devices may be determined. Other embodiments are described in the subject disclosure.

Figure 1:
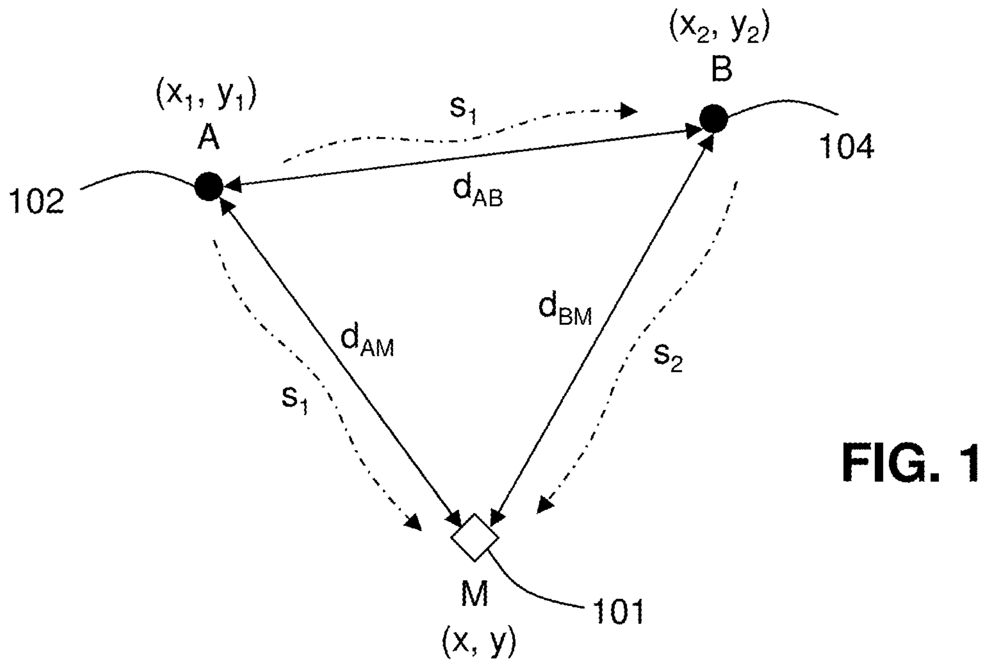
FIG. 1 is a block diagram illustrating an exemplary, non-limiting embodiment of a mobile tag and anchors for determining location information between the mobile tag and the anchors in accordance with various aspects described herein.
Figure 2:
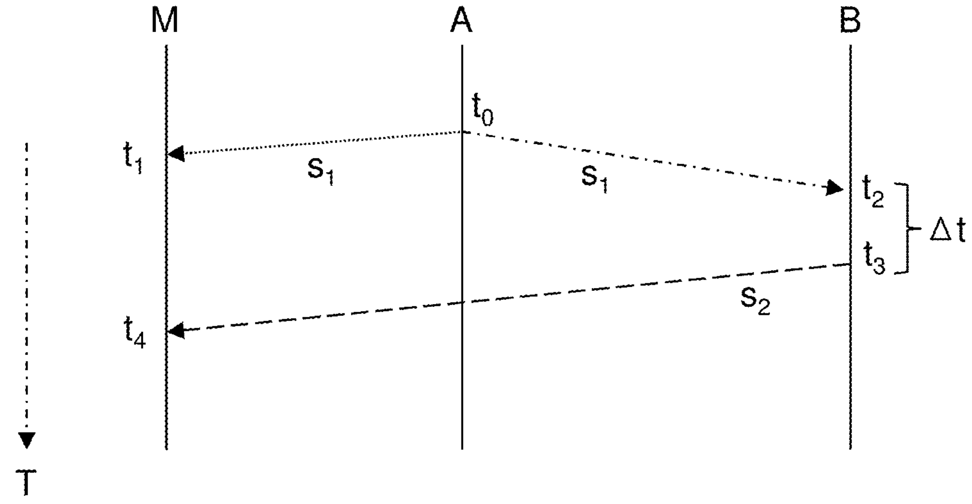
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time to, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t=t_3-t_2$) or can receive this information in the second wireless signal ($s_2$) transmitted by anchor 104. The equations that follow can be used to calculate a first possible location of the mobile tag 101 relative to anchor pairs 102, 104.

The distance between anchor 102 and the mobile tag can be represented as, $$d_{AM}=c(t_1-t_0) \quad \text{(EQ 1)},$$

where c is the speed of light constant. Similarly, the distance from anchor 102 to anchor 104 can be represented as, $$d_{AB}=c(t_2-t_0) \quad \text{(EQ 2)}.$$

Additionally, the distance from anchor 104 to the mobile tag 101 can be represented as, $$d_{BM}=c(t_4-t_3) \quad \text{(EQ 3)}.$$

The total distance traveled by the first wireless signal ($s_1$) from anchor 102 to anchor 104 and the second wireless signals ($s_2$) from anchor 104 to mobile tag 101 can be represented as, $$d_{AB}+d_{BM}=c(t_2-t_0+t_4-t_3) \quad \text{(EQ 4A)}.$$

To eliminate variable to, equation EQ1 can be subtracted from equation EQ 4A, resulting in, $$d_{AB}+d_{BM}-d_{AM}=C(t_2-t_1+t_4-t_3) \quad \text{(EQ 4B)}.$$

Substituting $\Delta t=t_3-t_2$ into EQ 4B results in equation, $$d_{AB}+d_{BM}-d_{AM}=c(t_4-t_1-\Delta t) \quad \text{(EQ 4C)}.$$

Since $d_{AB}$ is a constant known to the mobile tag 101 and the time variables of the factor $c(t_4-t_1-\Delta t)$ are also known to the mobile tag 101, EQ 4C can be rewritten as, $$d_{BM}-d_{AM}=\Delta d_1 \quad \text{(EQ 5)},$$

where $\Delta d_1=c(t_4-t_1-\Delta t)-d_{AB}$, which are constants known to mobile tag 101. Furthermore, in an example of two-dimensional (2D) space, the distance between anchor 102 and the mobile tag 101 can be represented as, $$d_{AM}=\sqrt{(x-x_1)^2+(y-y_1)^2},$$

and the distance between anchor 104 and the mobile tag 101 can be represented as, $$d_{BM}=\sqrt{(x-x_2)^2+(y-y_2)^2}.$$

Substituting $d_{AM}$ and $d_{BM}$ in EQ 5 results in the following equation, $$\sqrt{(x-x_2)^2+(y-y_2)^2}-\sqrt{(x-x_1)^2+(y-y_1)^2}=\Delta d_1 \quad \text{(EQ 6)}.$$

Figure 3:
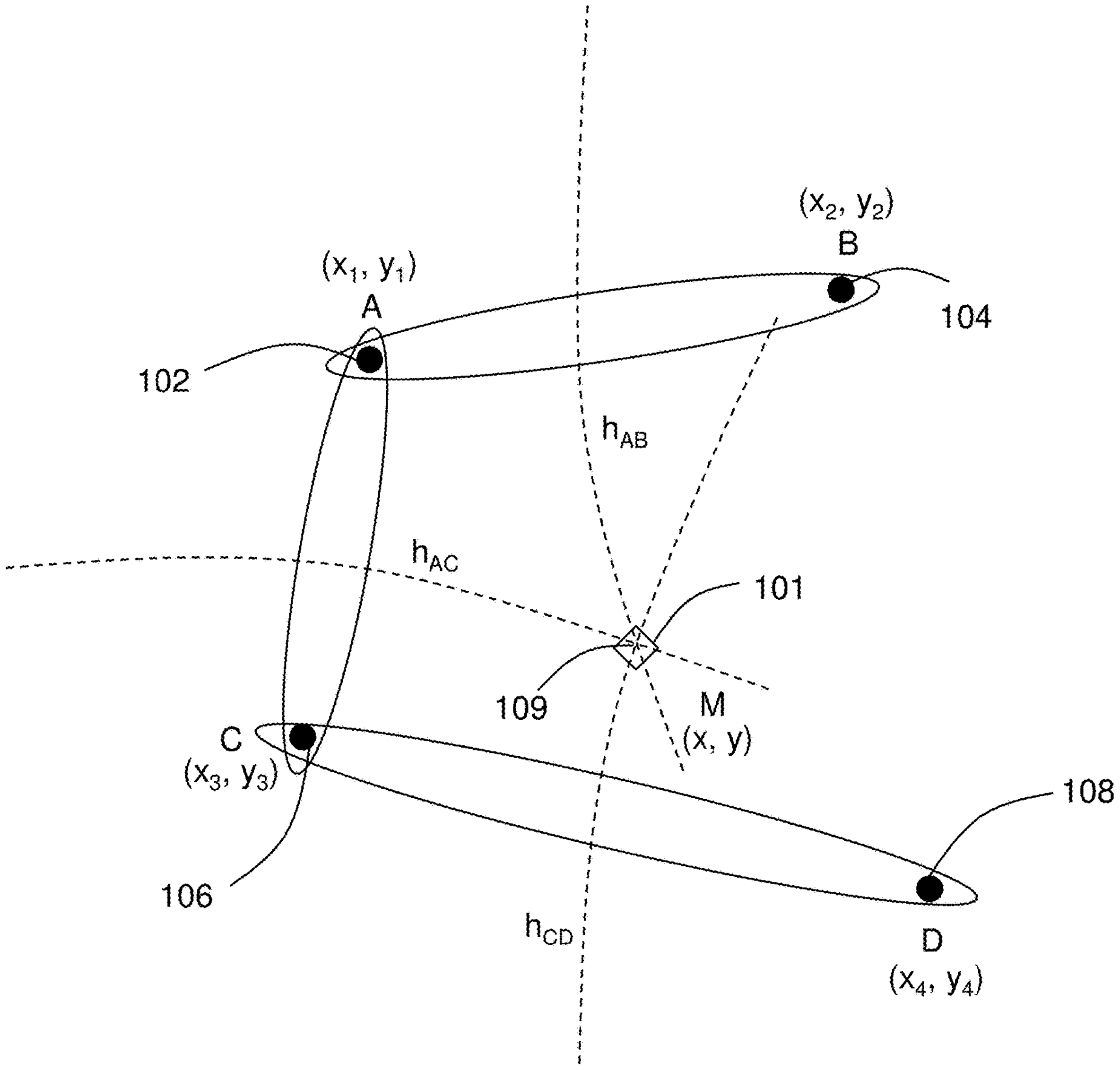
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors pairs 102, 104. Such a hyperbolic curve can be represented as, $$h_{AB}=\Delta d_1 \quad \text{(EQ 7A)},$$

where $h_{AB}=\sqrt{(x-x_2)^2+(y-y_2)^2}-\sqrt{(x-x_1)^2+(y-y_1)^2}$. The mobile tag 101 can be further configured to perform the above calculation across other anchor pairs as depicted in FIG. 3. For example, the mobile tag 101 can be configured to determine a hyperbolic curve between anchors 102 and 106 (i.e., anchors A and C) resulting in equation, $$h_{AC}=\Delta d_2 \quad \text{(EQ 7B)},$$

where $\Delta d_2$ is a constant known to mobile tag 101, and where $h_{AC}=\sqrt{(x-x_3)^2+(y-y_3)^2}-\sqrt{(x-x_1)^2+(y-y_1)^2}$. Additionally, the mobile tag 101 can be configured to determine a hyperbolic curve between anchors 106 and 108 (i.e., anchors C and D) resulting in equation, $$h_{CD}=\Delta d_3 \quad \text{(EQ 7C)},$$

where $\Delta d_3$ is a constant known to mobile tag 101, and where $h_{CD}=\sqrt{(x-x_4)^2+(y-y_4)^2}-\sqrt{(x-x_3)^2+(y-y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to anchors pairs 102 and 104 (anchors A/B), 106 and 108 (anchors A/C), 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchors 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
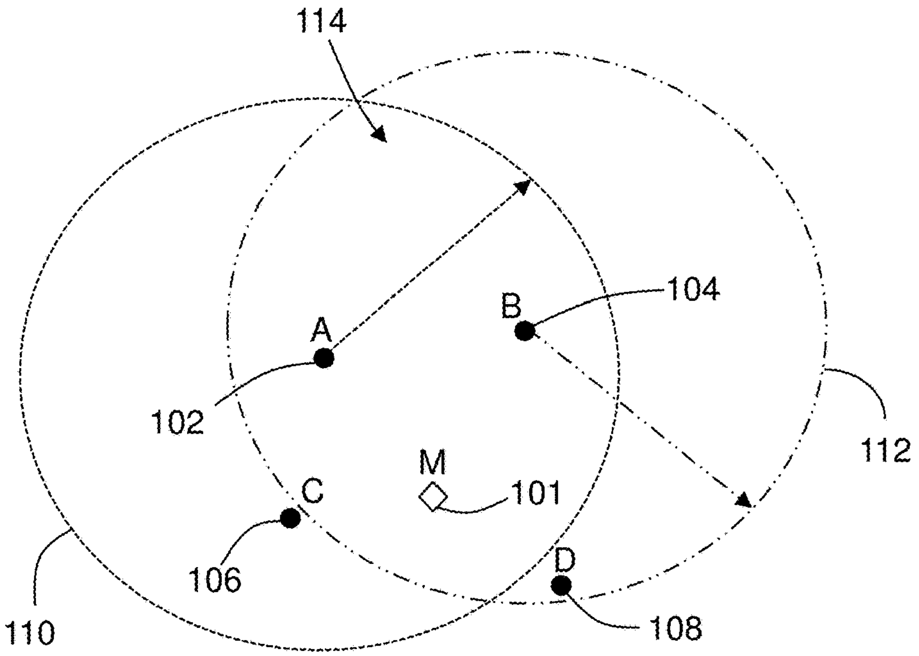
FIGS. 4A, 4B and 4C are block diagrams illustrating exemplary, non-limiting embodiments for selecting pairs of anchors in accordance with various aspects described herein.
Figure 4B:
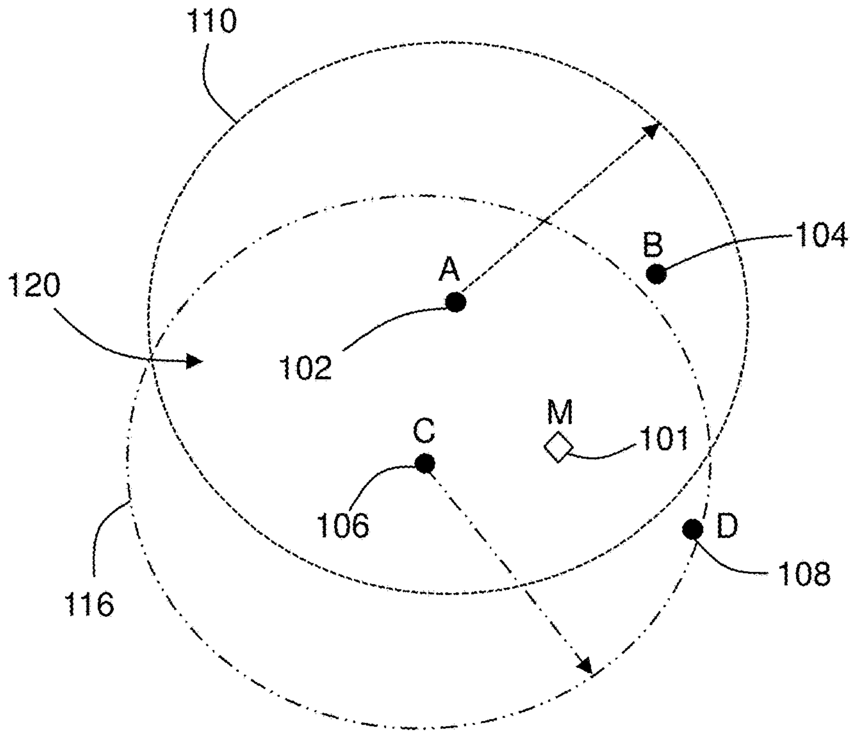
Figure 4C:
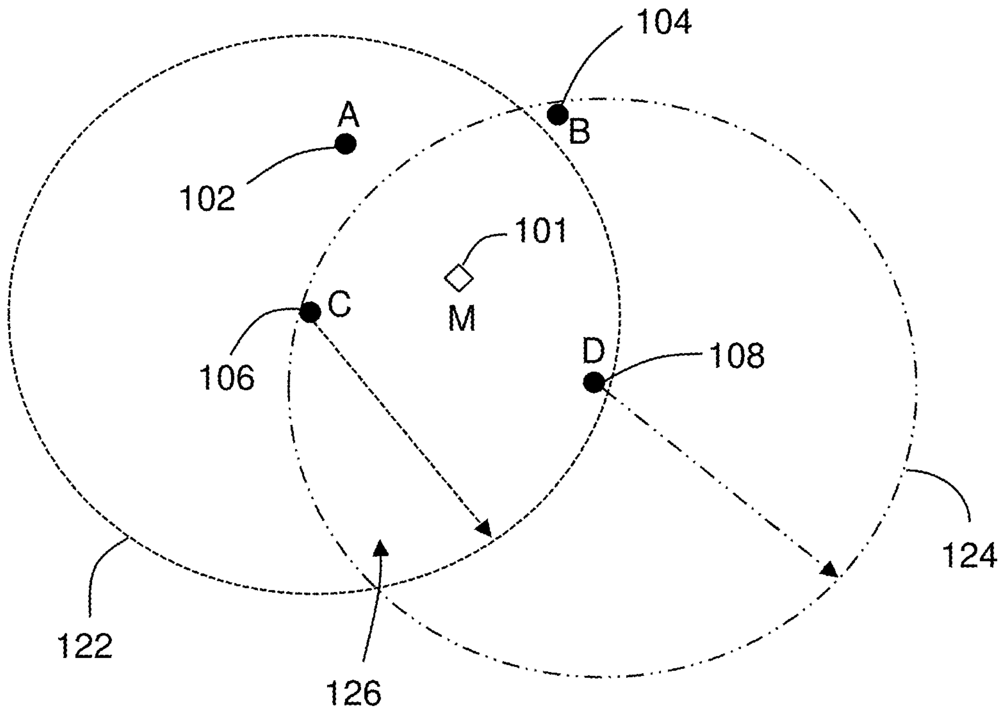

FIG. 4B shows that the coverage areas 110 and 116 of anchor pairs 102, 106 (anchors A/C), respectively, creates an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pairs 106, 108 (anchors C/D), respectively, creates an overlapping region 126 that encompasses anchors 106 and 108 and the mobile tag 101, thereby enabling the mobile tag 101 to calculate hyperbolic curve $h_{CD}$.

Figure 5:
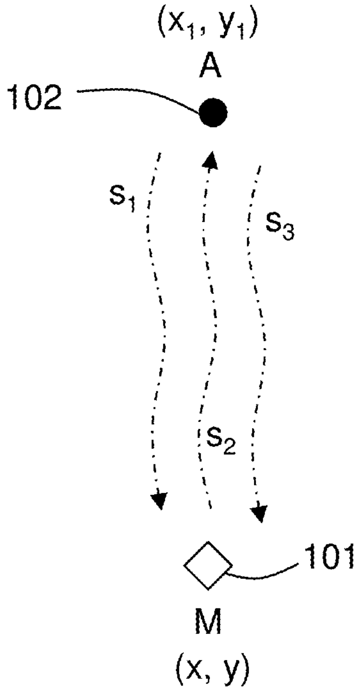
FIG. 5 is a block diagram illustrating an exemplary, non-limiting embodiment of a mobile tag and an anchor for determining location information between the mobile tag and the anchor in accordance with various aspects described herein.
Figure 6:
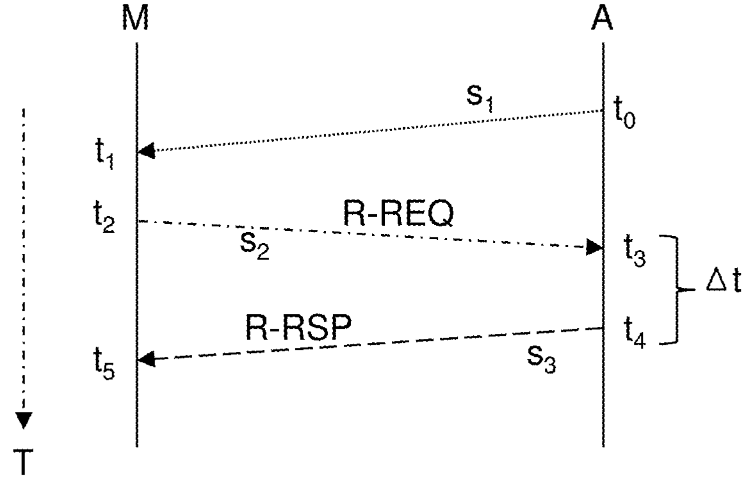
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r\text{-}trip} = d_{AM} + d_{MA},$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2).$$

Similarly, the distance from anchor 102 to the mobile tag 101 can be determined by, $$d_{AM} = c(t_5 - t_4).$$

With the above equations, the roundtrip distance can be rewritten as, $$d_{r\text{-}trip} = c(t_5 - t_4 + t_3 - t_2).$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t).$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA} = d_{r\text{-}trip}/2.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other.

It will be appreciated that the TDOA and TW-TOA processes described above can also between mobile tags 101. For example, FIGS. 1-3, 4A-4C, and 5-6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
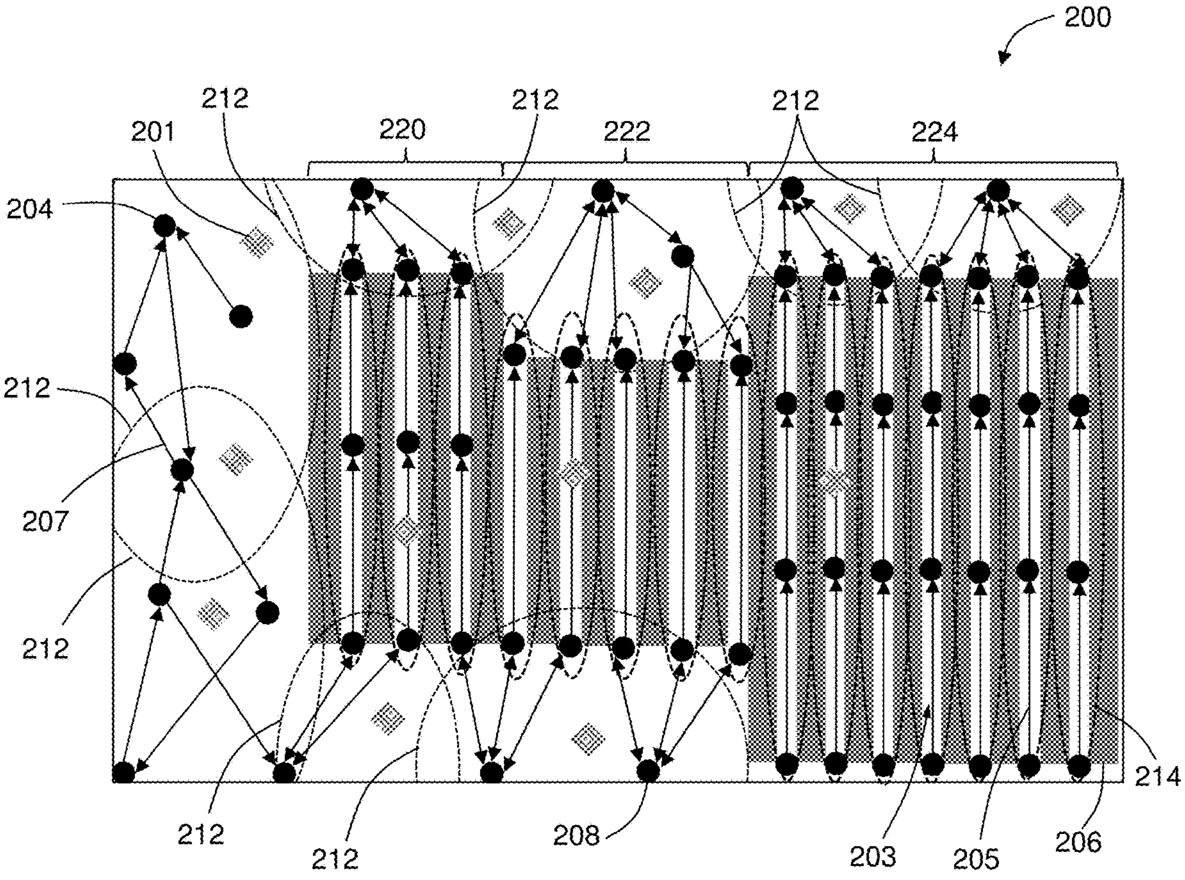
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure can be applied to. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 can be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
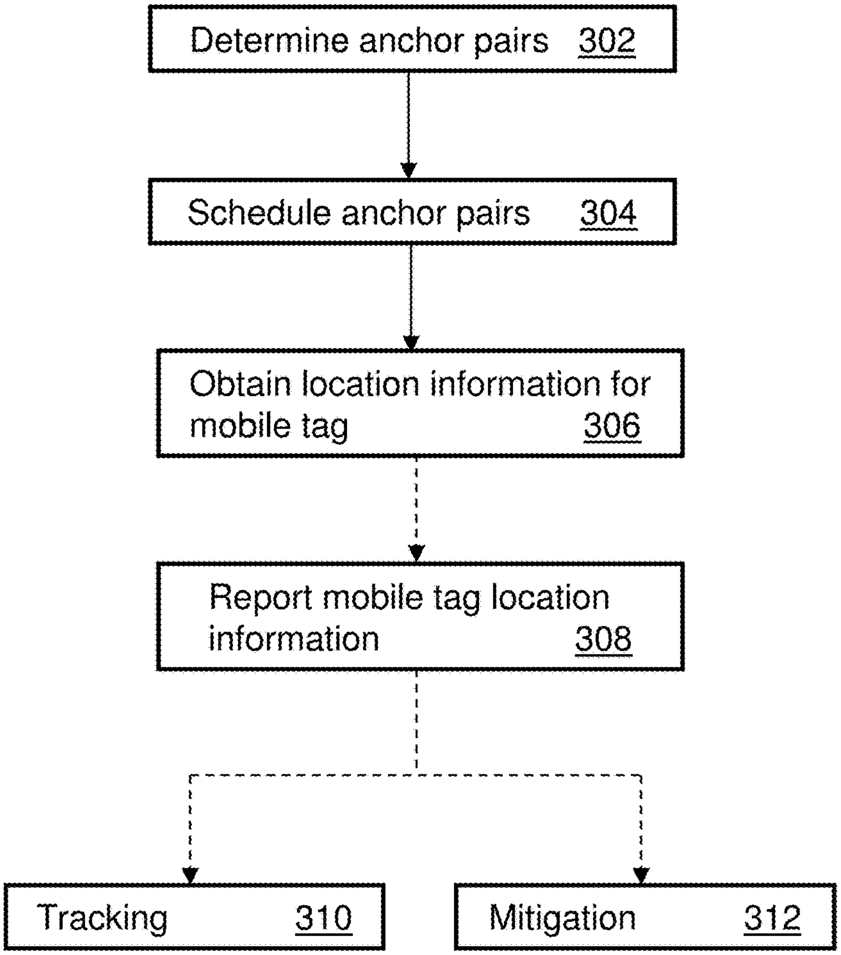
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system such as a server (described below in relation to FIG. 11) is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that other techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
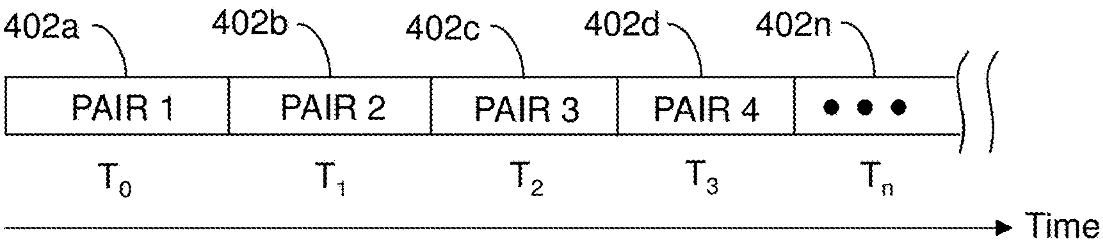
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$-$T_n$ (e.g., 402*a* through 402*n*). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 204 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($s_1$) an indication whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the lookup-table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, Wi-Fi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to decide where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby decide as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
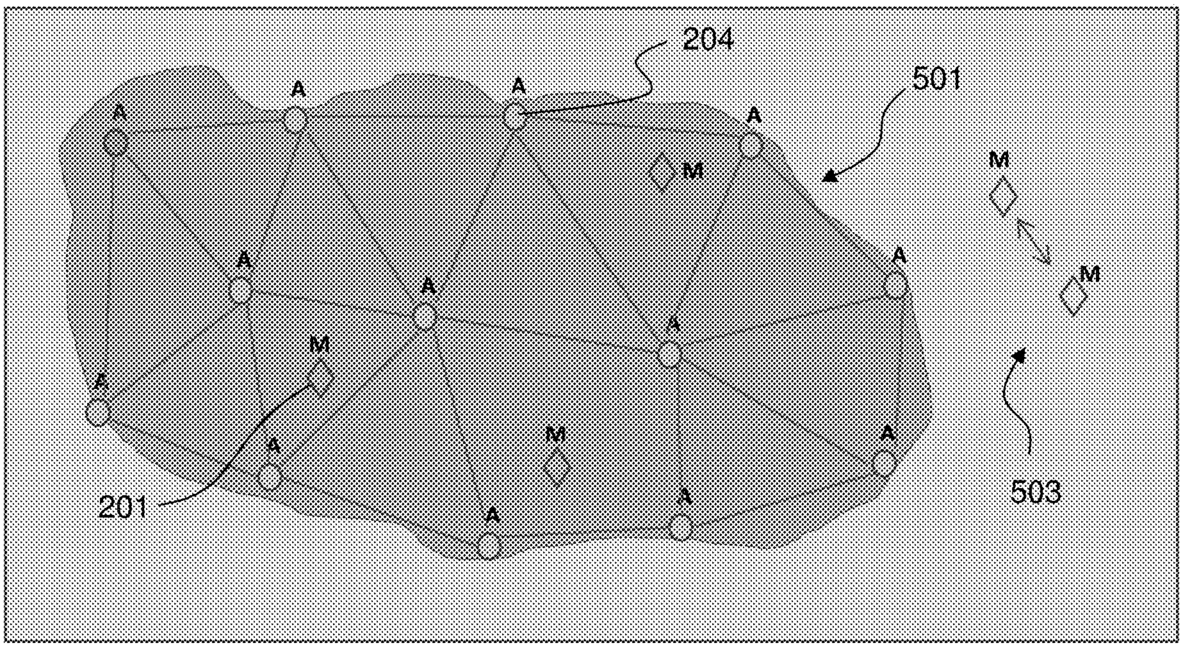
FIG. 10 is a block diagram illustrating an exemplary, non-limiting embodiment of environments where mobile tags can operate from in accordance with various aspects described herein.

FIG. 10 is a block diagram illustrating an exemplary, non-limiting embodiment of environments where mobile tags can operate from in accordance with various aspects described herein. Mobile tags 201 can at certain times operate within a network 501 of anchors 204 (such as described above in FIG. 7) to obtain their location as described above. However, users (or vehicles or other mobile devices) carrying a mobile tag 201 can transition to an open space 503 that is outside of the coverage of the network 501. When this occurs, the mobile tags 204 can be configured to transition to peer-to-peer communications (i.e., tag-to-tag communications) to continue to obtain location information relative to other mobile tags in the open space 503.

Figure 11:
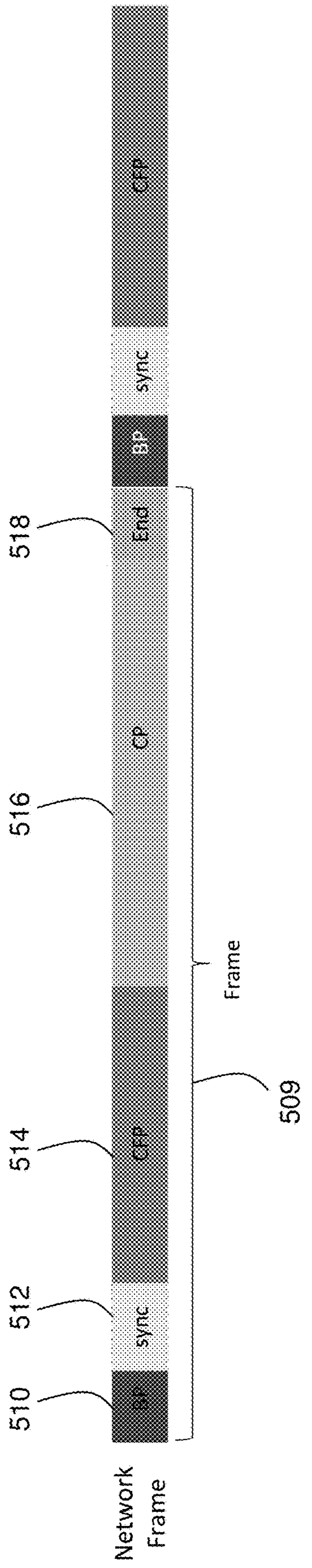
FIG. 11 is a block diagram illustrating an exemplary, non-limiting embodiment of a network frame in accordance with various aspects described herein.

FIG. 11 is a block diagram illustrating an exemplary, non-limiting embodiment of a network frame 509 that can be utilized by the network 501 in accordance with various aspects described herein. The network frame 509 can include a beacon signal 510, a sync period 512, a contention-free period (CFP) 514, a contention period (CP) 516, and an end period 518. The beacon signal 510 is generated by anchors 204 to provide anchors 204 and mobile tags 201 a means for synchronization. The CFP 514 portion of the frame 509 supports downlink TDOA (DL-TDOA) ranging packets, which in turn also supports the anchor pair scheduling depicted in FIG. 9. In the present context, the term “downlink” means communications from anchor to mobile tag, while the term “uplink” means communications from mobile tag to anchor. Transmissions during CFP 514 are scheduled to avoid simultaneous transmissions that lead to wireless signal interference. The CP 516 portion of the frame 509 supports uplink TDOA (UL-TDOA), TW-TOA ranging packets and additional data packets/control signaling packets and can be subject to simultaneous transmissions that in turn may interfere with each other.

The sync period 512 provides a short buffer period for anchors 204 to synchronize the start of the CFP 514 to each other, as described in more detail in connection with FIGS. 18-20 below. The end period 518 (which can be optional) provides a short buffer period for a next frame 509 preparation or can serve as guard interval for ACK message transmissions. The network frame 509 is periodic as shown by the next repetitive sequence of fields in a subsequent network frame. Various other scheduling and timing, including use of particular frame structures can be used with the exemplary embodiments of the subject disclosure as described in U.S. Pat. No. 10,779,118 filed Jan. 11, 2019, to Duan et al., the disclosure of which is hereby incorporated by reference herein in its entirety.

Figure 12:
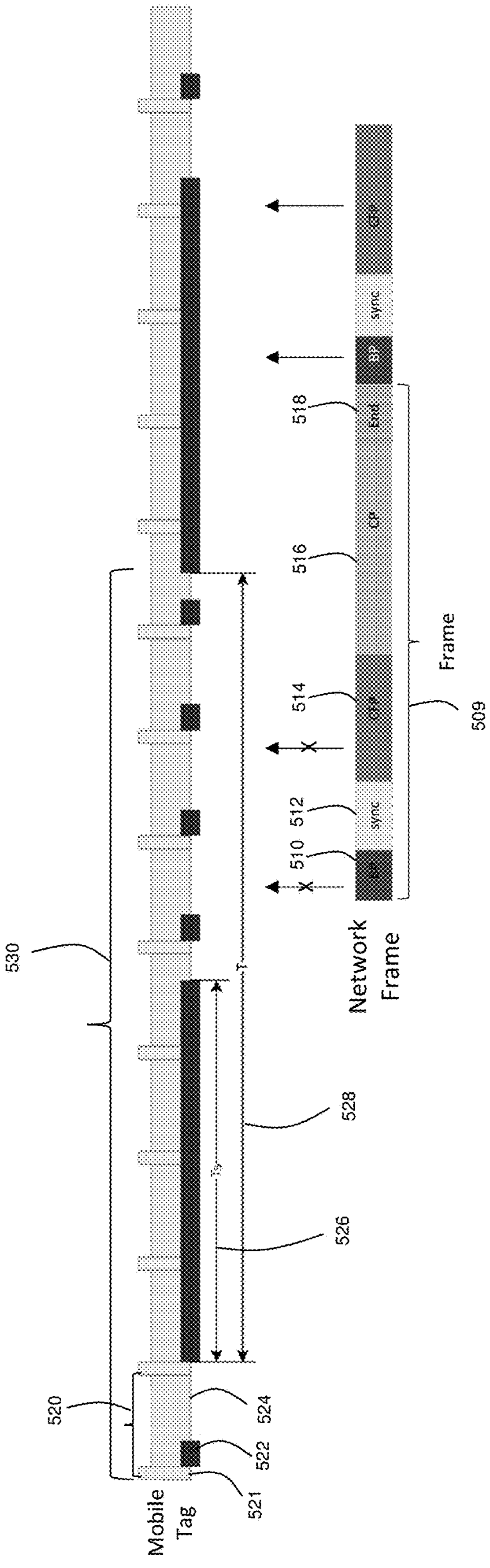
FIG. 12 is a block diagram illustrating an exemplary, non-limiting embodiment of a peer-to-peer frame configured for monitoring a presence of a network frame in accordance with various aspects described herein.

FIG. 12 is a block diagram illustrating an exemplary, non-limiting embodiment of a peer-to-peer frame configured for monitoring a presence of a network frame 509 in accordance with various aspects described herein. The peer-to-peer frame is referred to herein as a peer-to-peer super-frame 530. The peer-to-peer super-frame 530 can include a peer-to-peer sub-frame 520 and a network sub-frame 528. The peer-to-peer sub-frame 520 enables a mobile tag 201 located in the open space 503 of FIG. 10 to perform peer-to-peer range measurements as will be describe in FIGS. 14A-14D below. The peer-to-peer sub-frame 520 can include a peer-to-peer beacon signal 521, a ranging period 522, and listening period 524.

The peer-to-peer beacon signal 521 can be a Bluetooth (or ultra-wideband) signal that a mobile tag 201 broadcasts to other mobile tags 201 to initiate a ranging process to determine the relative location of the mobile tag 201 to other mobile tags 201 in its vicinity. The peer-to-peer beacon signal 521 can be an announcement message and/or synchronization signal to enable other mobile tags 201 to properly initiate a ranging process. During the ranging period 522, the mobile tag 201 can be configured to perform ranging measurements using ultra-wideband signals or other techniques (e.g., RF signal strength indicator (RSSI)). During the listening period 524, the mobile tag 201 can be configured to monitor response messages from other mobile tags 201 in its communication range using a Bluetooth (or ultra-wideband) receiver. The peer-to-peer sub-frame 520 is periodic as shown in FIG. 12.

To detect the presence of the network 501 with anchors 204, the mobile tag 201 can be configured to monitor during the network sub-frame 528 for a beacon signal 510 generated by one or more anchors 204 in the network 501. During the network sub-frame 528, the mobile tag 201 can be configured to turn on the ultra-wideband receiver to monitor a beacon signal 510 generated by one or more anchor 204 using an ultra-wideband transmitter. Generally, the ultra-wideband receiver of the mobile tag 201 draws more current than a Bluetooth narrowband receiver. To extend battery life of the mobile tag 201, the mobile tag 201 can be configured to maintain the ultra-wideband receiver on for a period 526 (depicted as Ts), which is less than the period (depicted as T) of the network sub-frame 528. The period 526 (Ts) can be chosen sufficiently large to enable the mobile tag 201 to detect a beacon signal of at least one network frame 509.

In the illustration of FIG. 12, a first instance of the beacon signal 510 is not detected because it occurs outside the period 526 (Ts) in which the ultra-wideband receiver of the mobile tag 201 is enabled to monitor for beacon signals. However, during a second instance of a super-frame 530, a beacon signal from a second instance of a network frame 509 is detected during the period 526 (Ts) of the network-subframe 528 of the mobile tag 201. Upon detecting the beacon signal 510, the mobile tag 201 can be configured to extend the period 526 (Ts) to enable the mobile tag 201 to receive multiple instances of a beacon signal 510 which enables the mobile tag 201 to synchronize its clock to the network frame 509, as set forth in more detail below in connection with FIG. 21. Upon achieving synchronization, the mobile tag 201 can be configured to determine whether to transition from a peer-to-peer communications mode (as depicted in FIG. 12) to a network communications mode (as depicted in FIG. 11) is warranted.

In an embodiment, the mobile tag 201 can be configured to store a coverage map of the network 501. The coverage map can indicate areas in the network 501 where access to anchors 204 is available and not available. Alternatively, or in combination with the foregoing embodiment, the mobile tag 201 can be configured to receive a message including a coverage map (or portion of the coverage map that represents a vicinity where the mobile tag 201 is located) from at least one anchor 204 after the mobile tag 201 has synchronized to the network frame 509. The mobile tag 201 can also be configured to track a history of its movements from the time it left the network 501 to an open space 503 not inside the wireless coverage area of the network 501. The mobile tag 201 can performing this type of dead reckoning by utilizing an accelerometer, gyroscope, and/or magnetometer (compass) to determine a history of positions from inside the network 501 to an open space 503 and back to the network 501. By tracking a history of positions, the mobile tag 201 can determine where it is in the coverage map of the network 501 and thereby determine whether it is in a communication range of one or more anchors 204 in the network 501. Alternatively, the mobile tag 201 can be configured to try to communicate with one or more anchors 204 and determine from ranging measurements whether it is located in the network 501. In yet another embodiment, the mobile tag 201 may receive messages from anchors 204 during CFP period and based on the number of messages and quality of messages received during CFP period determine if it is in the communication coverage of anchors 204 in the network 501.

Figure 13:
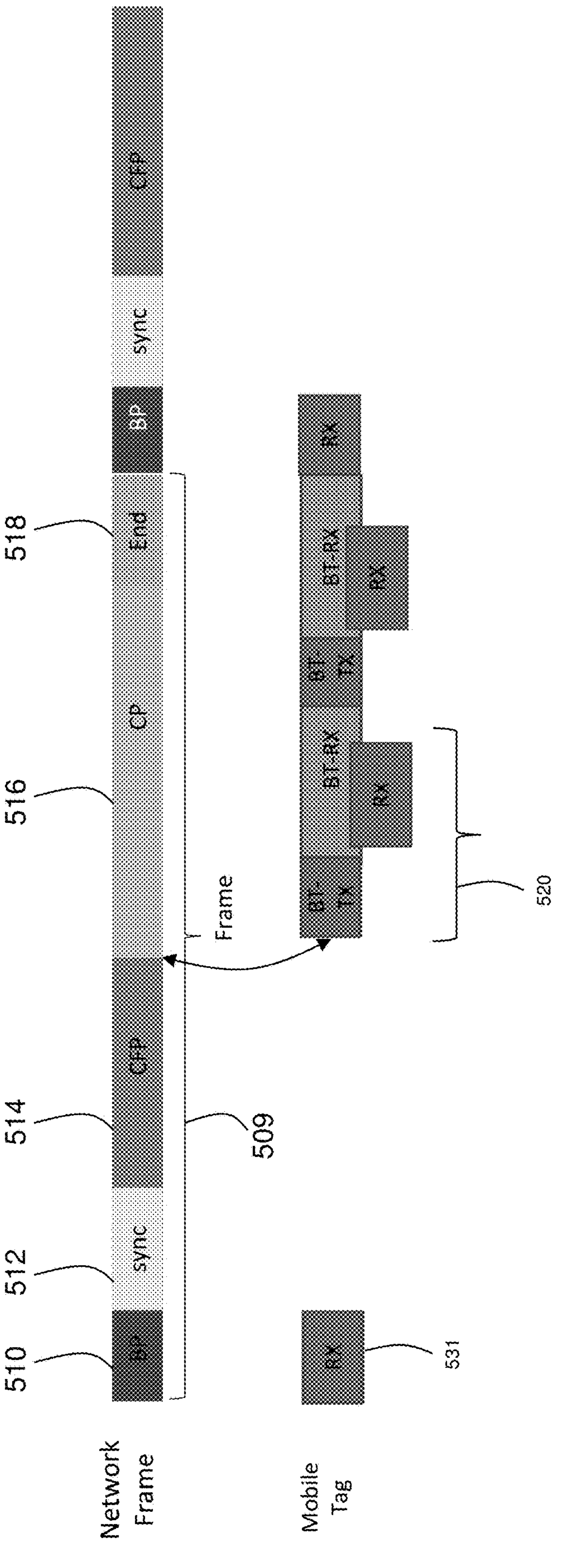
FIG. 13 is a block diagram illustrating an exemplary, non-limiting embodiment of a mobile tag configured to utilize peer-to-peer communications in a manner that avoids interfering with portions of a network frame in accordance with various aspects described herein.

If the mobile tag 201 cannot reliably communicate with anchors 204 in the network 501, or cannot make an accurate measurement of its location relative to one or more anchors, and/or it determines from a coverage map and position history that it is an area of the network 501 where anchors 204 are not accessible, then the mobile tag 201 can be configured to adjust peer-to-peer mobile tag communications to occur in a position in a network frame 509, which minimizes the chances of causing wireless signal interference with anchors 204 or other mobile tags 201 engaged in a network communications mode as depicted in FIG. 13.

FIG. 13 is a block diagram illustrating an exemplary, non-limiting embodiment of a mobile tag 201 configured to utilize peer-to-peer communications in a manner that avoids interfering with portions of a network frame 509 in accordance with various aspects described herein. To minimize RF interference with anchors 204 and/or other mobile tags 201 operating in a network communications mode, a mobile tag 201 that has insufficient coverage in the network 501 (e.g., cannot access one or more anchors 204) can be configured to maintain peer-to-peer communications in the CP 516 portion (i.e., contention period) of the network frame 509 and maintain synchronicity with the network frame 509 by monitoring the beacon signal 510 via a short listening period 531. Since the CP 516 portion allows for contentions (i.e., RF interference due to simultaneous RF transmissions), contentions caused by the mobile tag 201 performing peer-to-peer communications can be tolerated and will not cause issues with RF transmissions by anchors 204 utilizing the CFP portion 514 (contention-free period) of the network frame 509. The mobile tag 201 can perform this adjustment after it has synchronized its clock to the network frame 509 utilizing the beacon signal 510 as a reference signal, as set forth in more detail in FIG. 21 below. Once the mobile tag 201 has adapted peer-to-peer communications in the CP portion 516 of the network frame 509, the mobile tag 201 can cease to use timing associated with the peer-to-peer super-frame 530 depicted in FIG. 12, and instead resort to utilizing only the sub-frame 520 within the CP portion 516 of the network frame 509.

If, on the other hand, the mobile tag 201 determines that it is in the communication range of a sufficient number of anchors 204 in the network 501 to adequately determine its location in the network 501, then the mobile tag 201 can be configured to fully transition to a network communications mode by ceasing to utilize peer-to-peer communications altogether as depicted in FIG. 12 and rely exclusively on communications with anchors 204 utilizing the network frame 509 of FIG. 11.

Figure 14A:
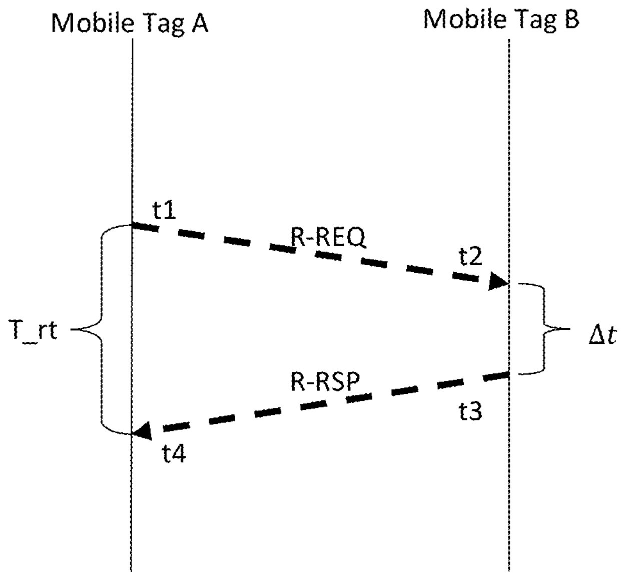
FIGS. 14A, 14B, 14C, 14D and 14E are block diagrams illustrating exemplary, non-limiting embodiments of peer-to-peer communications for determining a location of a mobile tag in accordance with various aspects described herein.

FIGS. 14A-14D describe various embodiments for peer-to-peer communications that can be applied to the aforementioned embodiments described above. FIG. 14A depicts a two-way time of arrival (TW-TOA) peer-to-peer process for determining distances between mobile tags (mobile tag A and mobile tag B). The process can begin at mobile tag A which transmits a range request (R-REQ) signal to mobile tag B at time $t_1$. Mobile tag B receives the R-REQ signal at time $t_2$. Mobile tag B processes the R-REQ signal for a period of Δt, and responsive thereto transmits a range response (R-RSP) signal at $t_3$. Mobile tag A receives the R-RSP signal at $t_4$. Mobile tag A can determine a roundtrip distance based on the formula $d_{r\text{-}trip}=d_{AB}+d_{BA}$, where $d_{r\text{-}trip}$ is the roundtrip distance, which is the sum of $d_{AB}$, the distance from mobile tag A to mobile tag B, and $d_{BA}$, the distance from mobile tag B to mobile tag A. The distance from mobile tag A to mobile tag B can be determined by $d_{AB}=c(t_2-t_1)$, where c is the speed of light. Similarly, the distance from mobile tag B to mobile tag A can be determined by $d_{BA}=c(t_4-t_3)$. Substituting the above equations, the roundtrip distance can be rewritten as $d_{r\text{-}trip}=c(t_4-t_3+t_2-t_1)$.

The time to process the R-REQ signal and to transmit the R-RSP signal via mobile tag B can be represented as $\Delta t=t_3-t_2$. Mobile tag B can be configured to transmit the value of Δt in the R-RSP signal for use by mobile tag A in calculating $d_{r\text{-}trip}$. Substituting Δt in $d_{r\text{-}trip}$ results in the formula: $d_{r\text{-}trip}=c(t_4-t_1-\Delta t)$. Since the values of $t_4$, $t_1$, and Δt are known to mobile tag A, mobile tag A can readily calculate $d_{r\text{-}trip}$. Mobile tag A can also calculate the distance from mobile tag A to mobile tag B based on the formula: $d_{AB}=d_{r\text{-}trip}/2$. It will be appreciated that mobile tag A can also be configured to know a priori the fixed value of Δt. In yet another embodiment, the processing time to receive the R-REQ signal and respond with the transmission of the R-RSP signal can be a fixed processing time interval known and used by all mobile tags performing TW-TOA analysis. In the foregoing embodiments, the value of Δt would no longer need to be transmitted in the R-RSP signal. It will be further appreciated that the R-REQ and the R-RSP signals can be transmitted using ultra-wideband signaling technology to increase the accuracy of the $d_{r\text{-}trip}$ calculations or derivatives thereof. Accordingly, the TW-TOA illustrated in FIG. 14A can be used by either mobile tag A or mobile tag B to calculate a relative distance between each other. This process can be utilized in the embodiments that follow below.

Figure 14B:
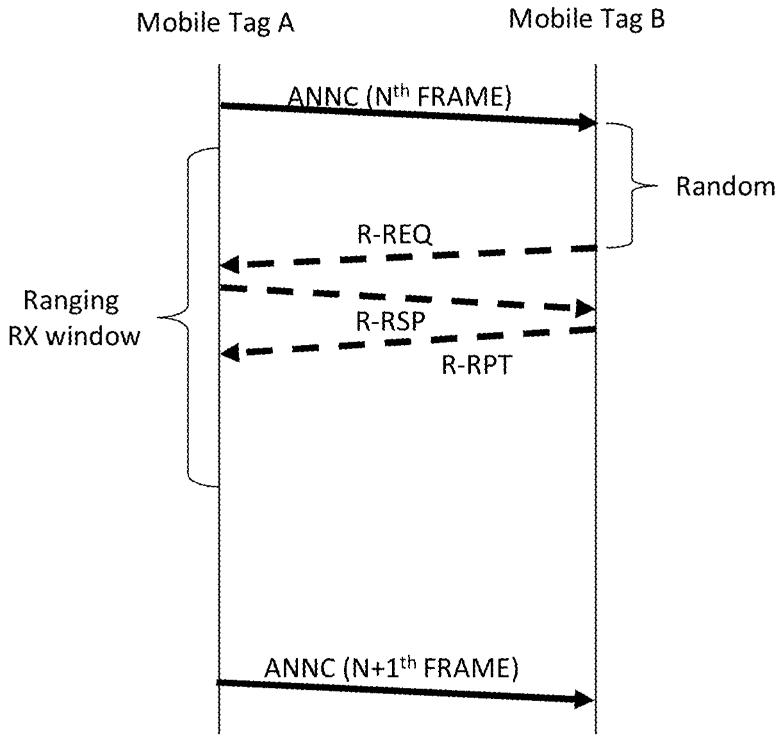

FIG. 14B depicts an exemplary, non-limiting embodiment of a peer-to-peer process for determining location data between mobile tags in accordance with various aspects described herein. In FIG. 14B, Mobile tag A can begin by transmitting an announcement wireless signal (ANNC) utilizing a low power narrow band transmitter (such as a Bluetooth transmitter). Upon receiving at mobile tag B, the announcement signal utilizing a narrow band receiver (e.g., Bluetooth receiver), mobile tag B can in response select a random time to transmit via a wideband transmitter a range request (R-REQ) signal utilizing a wideband signaling technology (e.g., ultra-wideband signal at high frequencies such as 500 MHz). Mobile tag A can be configured to turn on a wideband receiver (e.g., for receiving ultra-wideband signals) during a ranging RX window as shown in order to receive the R-REQ signal from mobile tag B and/or other mobile tags in a vicinity of mobile tag A that are responding to the announcement signal generated by mobile tag A.

Upon receiving the R-REQ signal, mobile tag A can be configured to enable a wideband transmitter (e.g., for transmitting ultra-wideband signals) to transmit a range response (R-RSP) signal. Mobile tag B can receive the R-RSP signal with a wideband receiver (e.g., for receiving ultra-wideband signals). Upon receiving the R-RSP signal, mobile tag B can determine the round-trip time between the R-REQ signal and the R-RSP signal and thereby determine a distance between mobile tag B and mobile tag A as described in relation to FIG. 14A. The R-RSP signal can include a processing time by mobile tag A to receive R-REQ and thereafter transmit R-RSP (Δt), or such time can be known to mobile tag B as previously described.

In addition to measuring a relative distance between mobile tags, mobile tag B (or mobile tag A) can be configured with multiple antennas to calculate an angle of arrival of the R-RSP signal based on a phase difference between the antennas. Such angle of arrival can be used to determine an angular orientation between mobile tag B and mobile tag A. By combining the angular orientation with a determination of the distance between mobile tags A and B, mobile tag B can also determine a location and angular orientation of mobile tag A relative to the location of mobile tag B.

Additionally, the announcement signal can be submitted periodically or asynchronously to prompt multiple measurements by mobile tag B (and other mobile tags in a vicinity for receiving the announcement signal) utilizing the process described in FIG. 14B. Distance and angular orientation can be used by mobile tag B (and other mobile tags) to also determine a trajectory of mobile tag A relative to mobile tag B (and vice-versa). Mobile tag B can also be configured to report to mobile tag A location information such as the measured distance, angular orientation, position, and/or trajectory of mobile tag A and/or B via a range report (R-RPT) signal. The R-RPT signal can be a narrow band signal (e.g., Bluetooth) or wideband signal (e.g., ultra-wideband). The trajectory data can be used to predict collisions between mobile tags A and B enabling each mobile tag to take mitigation action such as asserting an alarm at mobile tag B and/or mobile tag A.

Additionally, warning conditions can be provisioned at both mobile tags A and B to determine conformance with a required separation between mobile tags A and B. The warning conditions can be separation thresholds and/or trajectory thresholds. If the warning condition is not satisfied, mobile tags A and/or B can be configured to assert alarms. The alarms can be audible alarms, illuminating alarms (e.g., flashing colored light) or a combination thereof. Additionally, the embodiments depicted by FIG. 14B can be reversed in which mobile tag B is the one originating the announcement signal and mobile tag A calculates its location and/or orientation relative to mobile tag B as described above, and shares the same with mobile tag B.

Figure 14C:
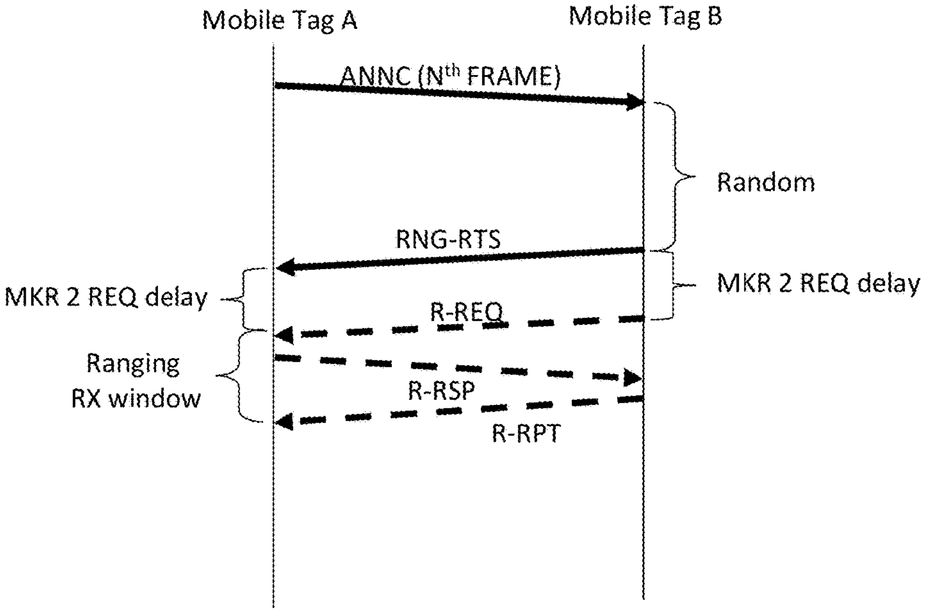

FIG. 14C depicts an adaptation to the embodiments of FIG. 14B. In particular, mobile tag B can be configured to transmit in response to the announcement signal a range ready-to-send (RNG-RTS) signal using narrow band signaling technology such as Bluetooth. The RNG-RTS signal can include timing information that indicates when mobile tag B will transmit the R-REQ signal. By knowing this timing, mobile tag A can substantially reduce the ranging RX window (which saves battery life of mobile tag A) by knowing the arrival time of the R-REQ signal and a predetermined time for receiving the R-RPT signal. If an R-RPT signal is not expected, mobile tag A can shorten the ranging RX window even further and thereby further improve battery life. The location and/or orientation measurements can be performed by mobile tag B as previously described in relation to FIG. 14B.

Figure 14D:
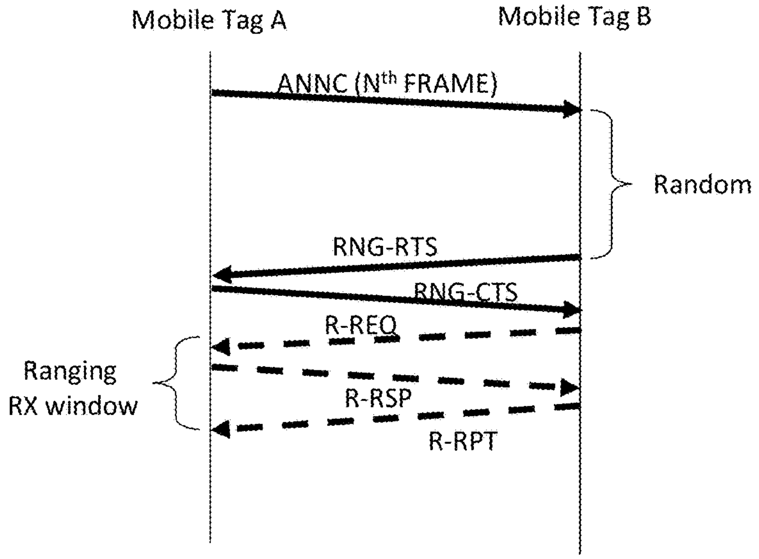

FIG. 14D depicts an adaptation to the embodiments of FIGS. 14B-14C. In this illustration, mobile tag A can be configured to transmit in response to the RNG-RTS signal a ranging clear-to-send (RNG-CTS) signal using narrow band signaling technology such as Bluetooth. The RNG-CTS signal can include timing information that indicates when mobile tag B should transmit the R-REQ signal. In this embodiment, mobile tag A can control the initial transmission time of the R-REQ signal thereby enabling mobile tag A to limit the size of the ranging RX window, reduce current draw from the ultra-wideband transceiver and thereby improve battery life of mobile tag A. The previously described embodiments of FIGS. 14B-14C are applicable to FIG. 14D for performing location and/or orientation measurements by mobile tag B and sharing such information with mobile tag A via the R-RPT signal.

Figure 14E:
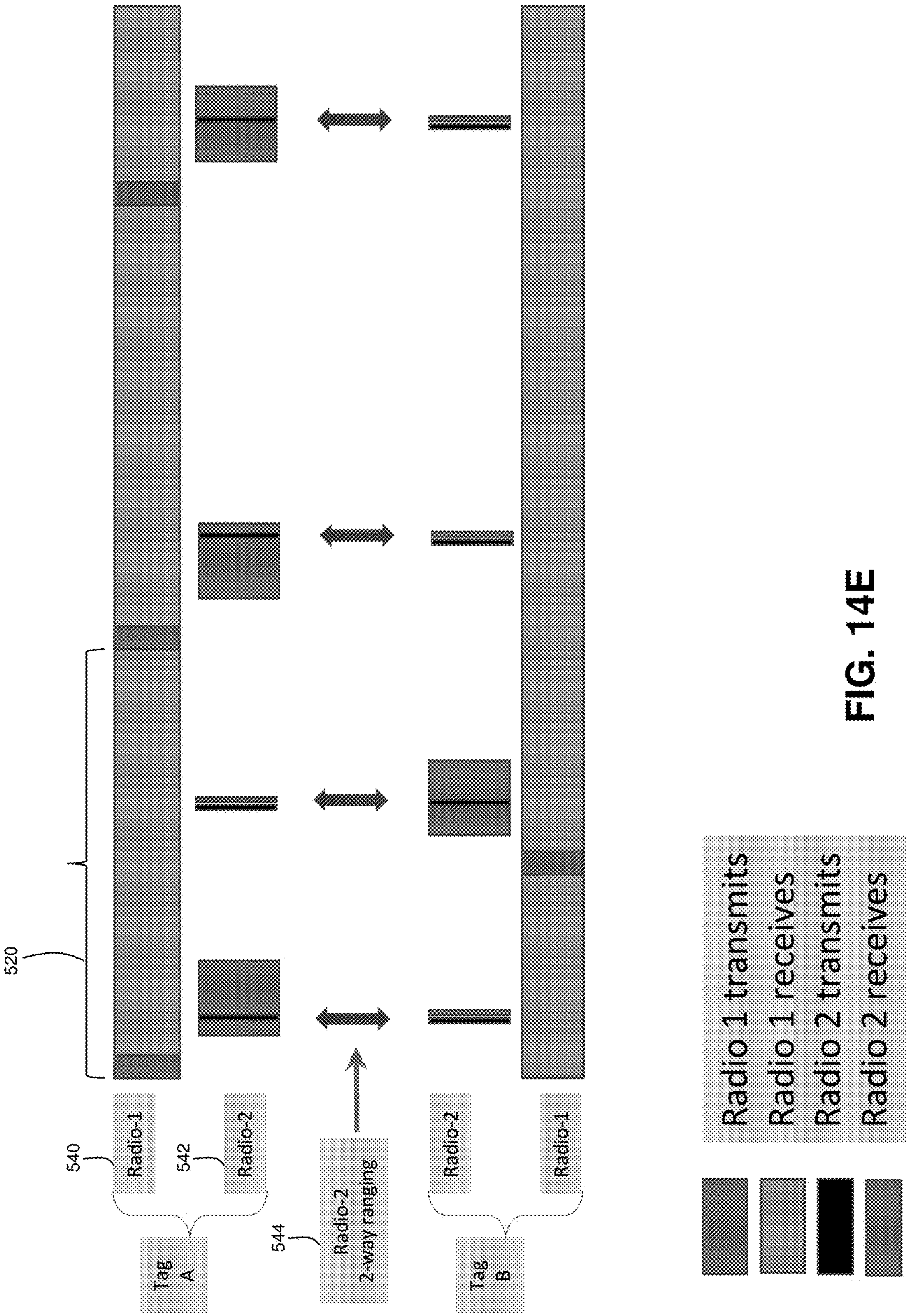

FIG. 14E temporally depicts illustrations of peer-to-peer communications between mobile tags based on transmission and reception intervals for achieving the embodiments described in relation to FIGS. 14A-14D. Each mobile tag is equipped with two radios (radio-1 540 and radio-2 542). Radio-1 540 is configured to transmit and receive Bluetooth signals, while radio-2 542 is configured to transmit and receive ultra-wideband signals. Since Bluetooth signals are narrow band signals, Bluetooth operations expend less power than ultra-wideband signals. Accordingly, utilizing a Bluetooth radio, when possible, can extend battery life of the mobile tags. FIG. 14E also depicts components of the peer-to-peer super-frame 530 previously describe in FIG. 12 for performing peer-to-peer range measurements 544. As described in FIG. 12, peer-to-peer sub-frames 520 can be combined with the network sub-frame 528 to form a peer-to-peer super-frame 530, which enables a mobile tag 201 to perform peer-to-peer range measurements with other mobile tags 201 while monitoring for a presence of network anchors (not shown in FIG. 14E) that can trigger a process for transitioning a network communications mode as will be described further in method 600 of FIG. 17.

Figure 15:
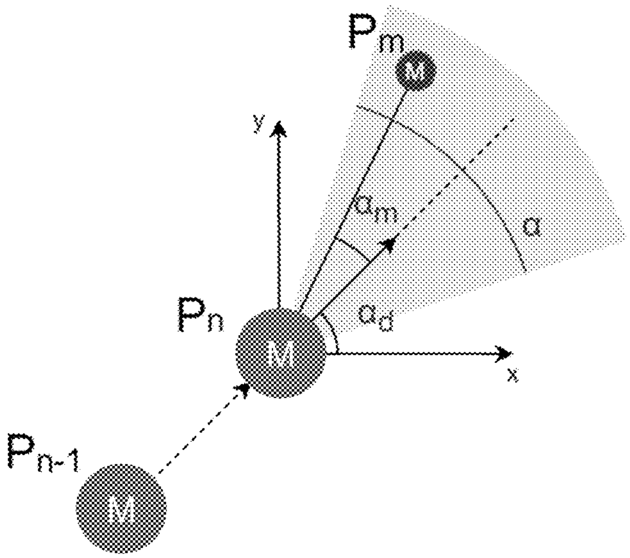
FIG. 15 is a block diagram illustrating an exemplary, non-limiting embodiment of capabilities of a mobile tag to determine its location in a network of anchors providing location services in accordance with various aspects described herein.

FIG. 15 is a block diagram illustrating an exemplary, non-limiting embodiment of capabilities of a mobile tag 201 to determine its location in a network of anchors providing location services in accordance with various aspects described herein. In the illustration of FIG. 15, a mobile tag 201 located in the network 501 of anchors 204 and operating in a network communications mode (i.e., exclusively performing ranging measurements with anchors 204) can determine its relative position to another mobile tag 201 and based on a history of positions ($P_{n-1}$ to $P_n$) its angular trajectory relative to the other mobile tag 201. Such angular trajectory can be used to assert alarms to avoid collisions, enforce social distancing, and/or other policies set by an administrator of the mobile tags 201 and/or network 501 of anchors 204.

Figure 16:
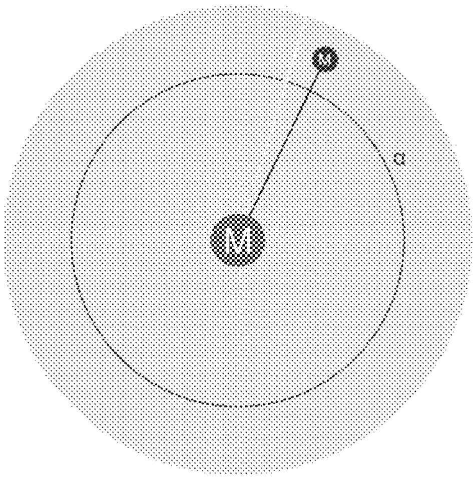
FIG. 16 is a block diagram illustrating an exemplary, non-limiting embodiment of capabilities of a mobile tag to determine its location utilizing peer-to-peer communications with other mobile tags in accordance with various aspects described herein.

FIG. 16 is a block diagram illustrating an exemplary, non-limiting embodiment of capabilities of a mobile tag 201 to determine its location utilizing peer-to-peer communications with other mobile tags 201 in accordance with various aspects described herein. In the illustration of FIG. 16, the mobile tag 201 is limited to determining its relative location to another mobile tag 201 without trajectory information or angular orientation. In an alternative embodiment, the mobile tag 201 can perform the functions described in FIG. 15 with instrumentation such as one or more accelerometers, one or more gyroscopes, and/or a magnetometer. With such instrumentation, a mobile tag 201 can utilize as a reference point a last known location of the mobile tag 201 while in the network 501 of anchors 204 and determine thereafter utilizing the instrumentation a history of positions ($P_{n-1}$ to $P_n$) and its angular trajectory relative to another mobile tag 201 utilizing similar instrumentation.

Figure 17:
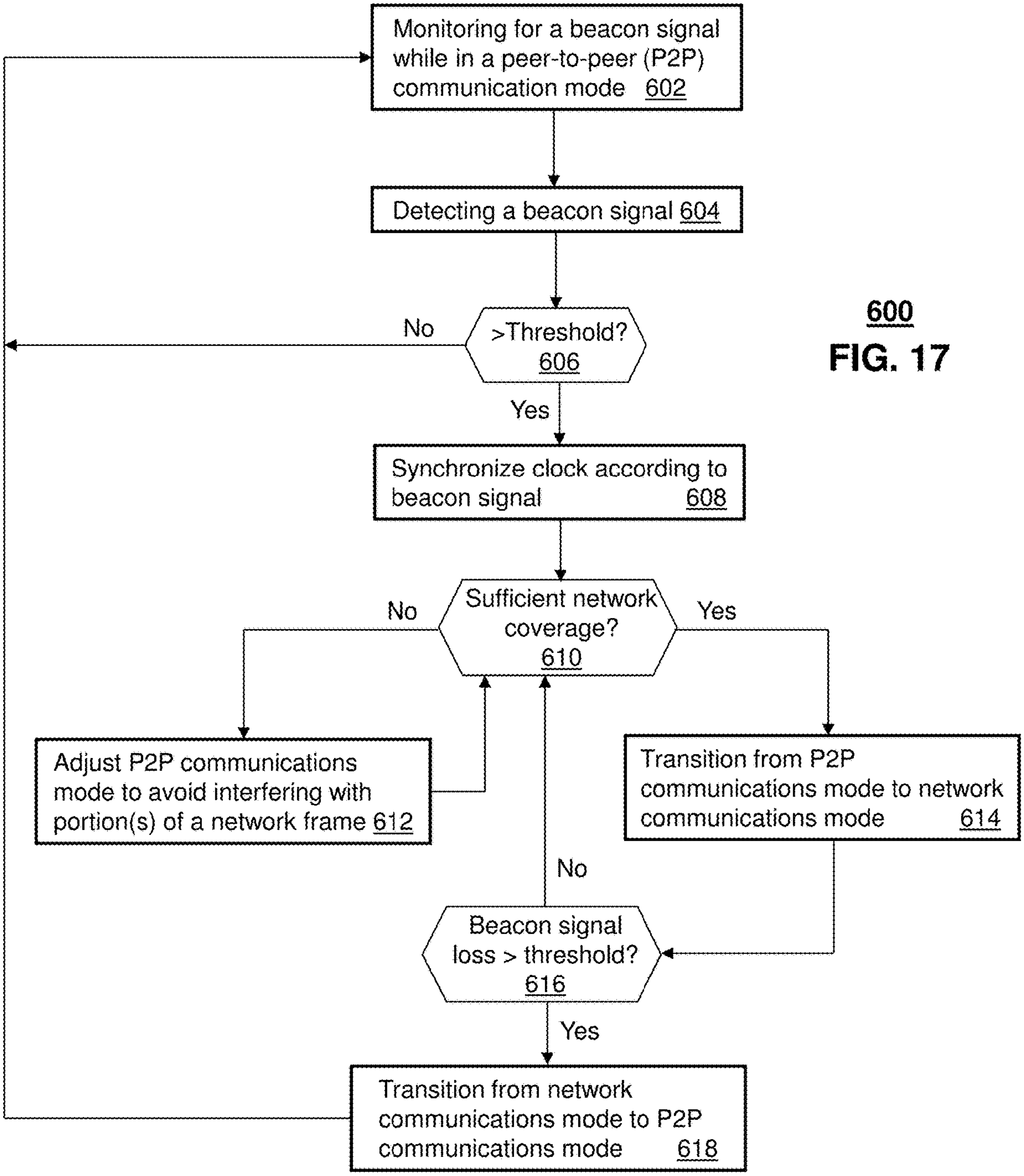
FIG. 17 depicts an illustrative embodiment of a method for transitioning between modes of communications; particularly, peer-to-peer communications mode and network communications mode in accordance with various aspects described herein.

FIG. 17 depicts an illustrative embodiment of a method 600 for transitioning between modes of communications; particularly, peer-to-peer communications mode and network communications mode in accordance with various aspects described herein. Method 600 can begin with step 602 where a mobile tag can be configured to monitor a beacon signal while in a peer-to-peer communications mode utilizing, for example, the peer-to-peer super-frame 530 (and corresponding network sub-frame 528) shown in FIG. 12. As noted earlier, the peer-to-peer communication mode may be invoked when the mobile tag 201 transitions out of the coverage area of the network 501 of anchors 204 into an open space 503 or when the mobile tag 201 is located in the network 501 in an area that lacks coverage from anchors 204, which causes the mobile tag 201 to resort to the embodiment described in relation to FIG. 13.

Upon detecting a beacon signal at step 604 while in a peer-to-peer communications mode, the mobile tag 201 can proceed to step 606 where it determines if a threshold of instances of a beacon signal has been satisfied (e.g., a threshold set to greater than 2 consecutive beacon signals). If the threshold is not satisfied, the mobile tag 201 can be configured to return to step 602 and continue the monitoring process. If the threshold is satisfied, the mobile tag 201 can be configured at step 608 to synchronize its clock to the network frame 509 of FIG. 11 utilizing one or more instances of the beacon signal, as set forth in more detail in FIG. 21 below. In an embodiment, synchronization can take place during one or more instances of the synchronization period 512. Once synchronized, the mobile tag 201 can proceed to step 610 to determine if there is sufficient coverage in the network 201 to transition to a network communications mode (i.e., performing ranging measurements exclusively with the assistance of one or more anchors 204).

In one embodiment, the coverage determination of step 610 can be performed by the mobile tag 201 by comparing its location to a look-up table (or database) of sub-coverage areas in the network 501 (not shown in FIG. 10). If the mobile tag 201 has instrumentation to reasonably determine where it is located within the network 501, such location information may be sufficient for the mobile tag 201 to determine from a look-up table (or database) whether it is in an area of the network 501 where it has sufficient access to anchors 204 to safely transition to a network communications mode, or whether it should transition to an adjusted peer-to-peer communications mode as depicted FIG. 13. The look-up table (or database) can be provided by one or more anchors at a previous time when the mobile tag 201 was located in the network 501 and operating in a network communications mode or from another source (e.g., mobile tag 201 paired with a communication device such as a smartphone that can communication with a server of the network 501 via a cellular network or other communication means). In another embodiment, the mobile tag 201 can be configured to receive one or more messages from one or more anchors 204 transmitting its location in the network 501, which the mobile tag 201 can then compare to the look-up table (or database) to determine if it is in a location that supports a safe transition to a network communications mode. In another embodiment, the mobile tag 201 may receive one or more messages from one or more anchors 204 in the network 501 during the CFP period, which the mobile tag 201 can use to determine if it is able to transition to a network communications mode based on the number of messages and/or quality of the received messages from anchors 204 in the network 501 during the CFP period. For example, the quality of messages can be determined from a number of consecutive received messages exceeding a signal strength threshold. Such measurements can enable a mobile tag 201 to determine if there is sufficient (or insufficient) coverage in the network 501 of anchors 204 to transition from peer-to-peer communications to network communications or remain in peer-to-peer communications but operate in the mode shown in FIG. 13.

If the mobile tag 201 detects at step 610 that there is insufficient coverage in the network 501 relative to its current location to transition to a network communications mode, then the mobile tag 201 can proceed to step 612 where the mobile tag 201 can transition from a peer-to-peer communications mode as depicted in FIG. 12 to an adjusted peer-to-peer communications mode as shown in FIG. 13 (or maintain this adjusted communications mode if the mobile tag 201 had already previously implemented step 612). Alternatively, if the mobile tag 201 detects at step 610 that there is sufficient coverage to transition to a network communications mode, the mobile tag 201 can transition from a peer-to-peer communications mode as depicted in FIG. 12 to a network communications mode depicted by FIG. 11 where it performs ranging measurements exclusively with the assistance of anchors 204 of the network 501.

Once the transition from a peer-to-peer communications mode to a network communications mode occurs at step 614, the mobile tag 201 can be configured to monitor a lack of a presence of a beacon signal generated by the anchors 204 of the network 501. If the number of instances where the mobile tag 201 detects a lack of a beacon signal satisfies a threshold (greater than 2 consecutive lost beacon signals), the mobile tag 201 can transition to step 618 where it transitions from a network communications mode as depicted in FIG. 11 to a peer-to-peer communications mode as depicted by FIG. 12, and begins to monitor at step 602 for a presence of a beacon signal to transition back to the network communications mode once the instances of beacon signals satisfies the threshold of step 606 as previously described. If no lost beacon signals are detected at step 616, the mobile tag 201 can proceed to step 610 to determine if there's sufficient coverage to remain in the network communications mode at step 614. If the mobile tag 201 determines at step 616 that there is insufficient coverage, then the mobile tag 201 can proceed to step 612 and perform peer-to-peer communication as previously described above.

While for purposes of simplicity of explanation, the respective processes are shown and described as a series of blocks in FIG. 17, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 18:
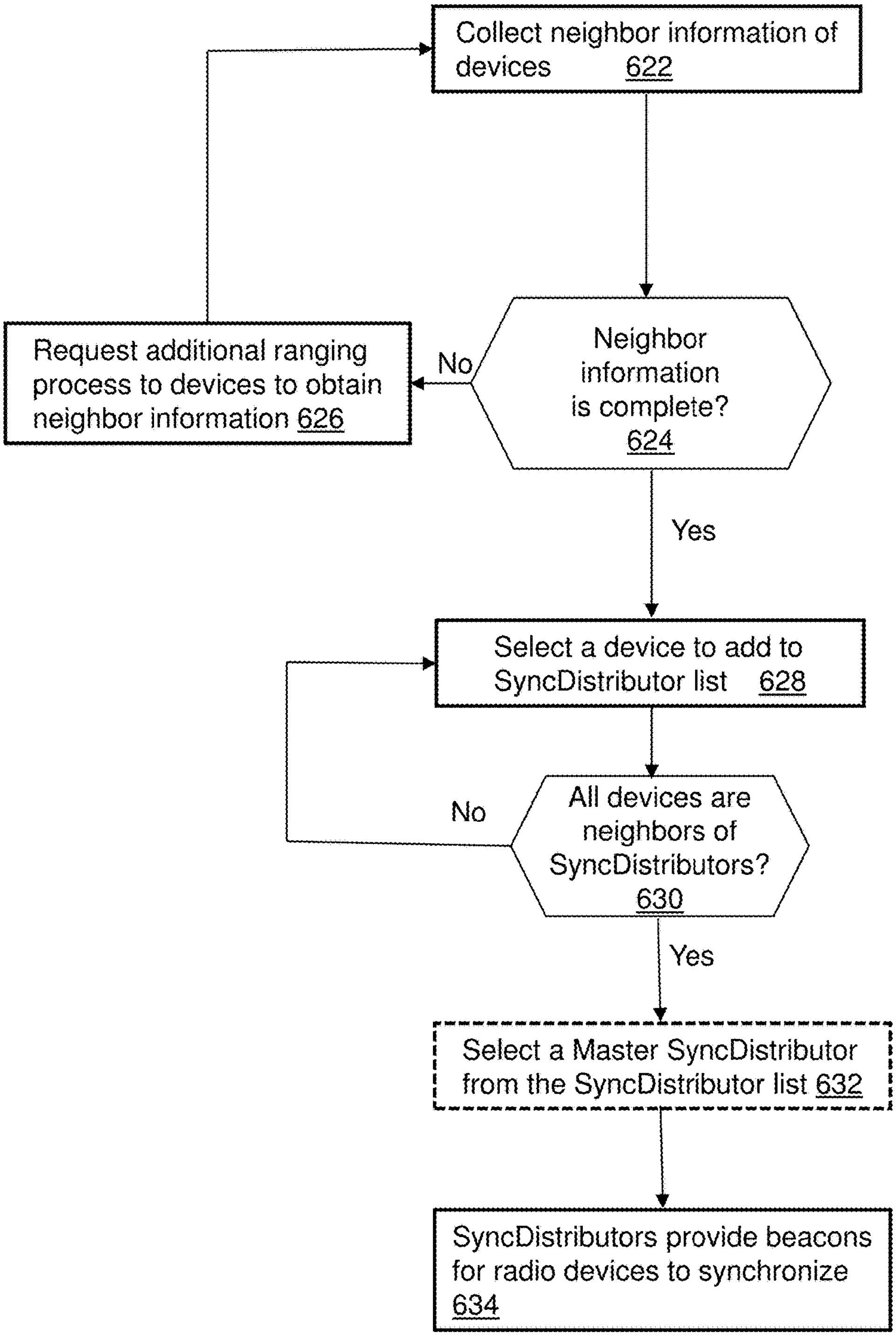
FIG. 18 depicts an illustrative embodiment of a method for selecting a subset of radio devices in a wireless network to propagate time synchronization messages, also known as beacon messages, in accordance with various aspects described herein.

FIG. 18 depicts an illustrative embodiment of a method 620 for selecting a subset of radio devices in a wireless network to propagate time synchronization messages, also known as beacon messages or beacons, in accordance with various aspects described herein. In the wireless network, a device equipped with a wireless transceiver and a processor running on a local clock is considered to be a radio device. The subset of radio devices in the network delivering beacons are known as SyncDistributors. In an embodiment, the subset of radio devices selected as SyncDistributors are anchors. The objective of method 620 is to establish a backbone list of radio devices as SyncDistributors that are connected with each other and can supply beacons to the rest of the radio devices in the network. The beacons from SyncDistributors must be heard by other radio devices that are not assigned as SyncDistributors.

Method 620 begins with step 622 by collecting information of all of the radio devices in the network and their immediate neighbors. If a first radio device can receive a message transmitted from a second radio device, then the first radio device is a neighbor of the second radio device, i.e., one hop away. In step 624, the system checks to see if all the neighbor information is complete. If not, then in step 626, the system requests an additional ranging process of certain devices to obtain the incomplete information, and the process repeats. This method of identifying and updating neighbor information is set forth in more detail in connection with FIG. 20 below. Once the neighbor information is complete, then the process continues with step 628.

In step 628, the system selects a first device in the network meeting certain criteria. In an embodiment, the criteria comprise a radio device that has the largest number of neighbors. In another embodiment, the criteria include a radio device that has the best link quality to a neighboring SyncDistributor. Next, the system adds the radio device to a SyncDistributors list. Next, in step 630, if all of the devices in the network are not a neighbor of any device on the SyncDistributors list, then the process repeats step 628 by selecting a second device from the neighbors of the first selected device, using either the same or different criteria, if necessary. This process continues until any remaining unselected device is at least a neighbor of at least one device on the SyncDistributors list. In an embodiment, the process continues to step 632 by optionally selecting one SyncDistributor in the SyncDistributors list and designating the selected SyncDistributor as a master SyncDistributor. Finally, in step 634, the SyncDistributors provide beacons to enable the radio devices in the wireless network to synchronize their clocks, as set forth in more detail below in connection with FIGS. 19-21.

Figure 19:
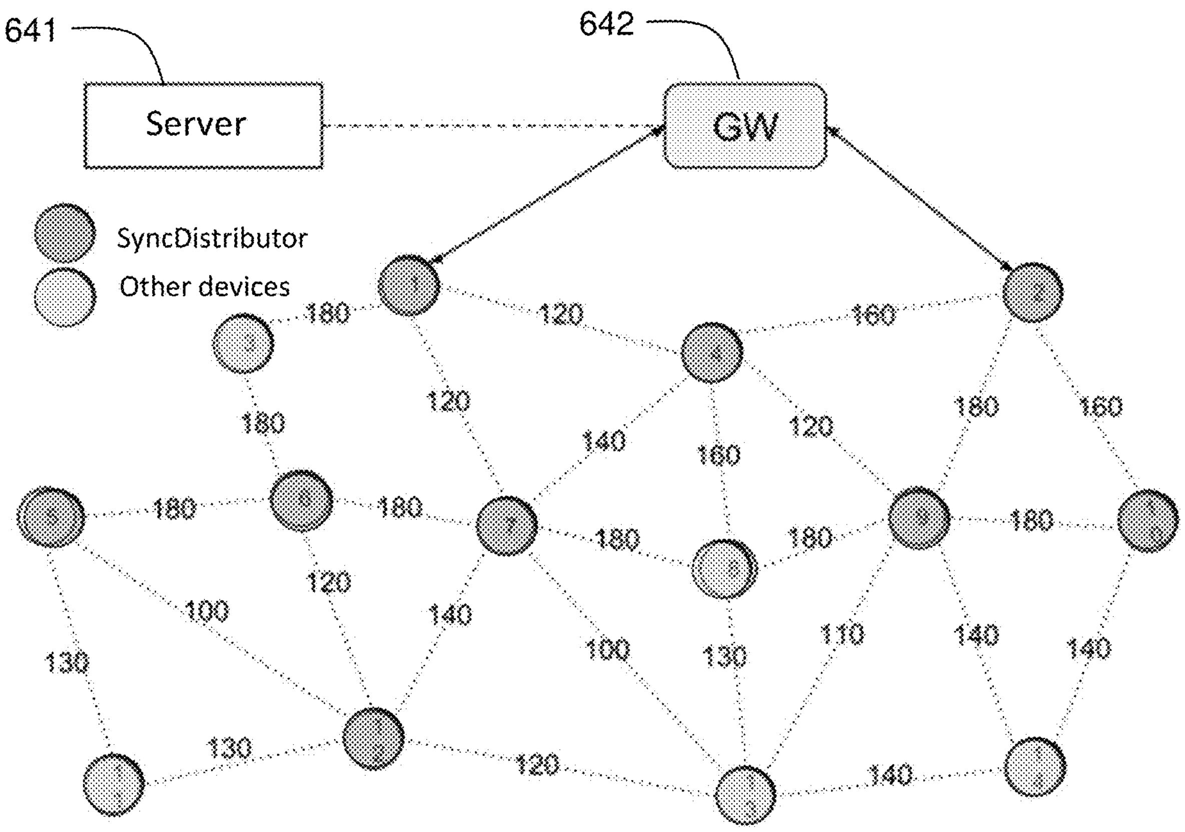
FIG. 19 is a block diagram depicting an illustrative embodiment of a network of SyncDistributors and other radio devices selected in accordance with various aspects described herein.

FIG. 19 is a block diagram 640 depicting an illustrative embodiment of a network of SyncDistributors and other radio devices selected in accordance with various aspects described herein. As shown in FIG. 19, a server 641 is communicatively coupled to a gateway 642, which in turn is communicating with two radio devices 1, 2 in the wireless network. Radio devices 1, 2, 4, 5, 6, 7, 9, 10 and 12 are on the SyncDistributor list, and radio devices 3, 8, 11, 13 and 14 are not. The numbers on each link illustrate a metric of link quality.

As the radio signal is heavily affected by the surrounding environment, the wireless communication between a pair of radio devices may be temporally or permanently blocked due to the change of the environment or the physical movement of some device(s). In this case, the neighbors of a radio device can sometimes change. Changes in neighbors are accommodated by taking the following actions:

- If the communication between two non-SyncDistributor devices is blocked, there may be no need for reselection of SyncDistributors.
- If the communication between a SyncDistributor and a non-SyncDistributor device is blocked and if the non-SyncDistributor device has no other SyncDistributor in its neighbor list, a new SyncDistributor needs to be selected from its neighbor list. The method starts with the existing set of SyncDistributors and expands the set using the SyncDistributors on the SyncDistributor list assembled in steps 628-630 until the non-SyncDistributor has at least one SyncDistributor in its neighborhood.
- If the communication between two SyncDistributors is blocked, if the set of SyncDistributors is still a connected network, there may be no need for reselection of SyncDistributors; if the set of SyncDistributors is no longer connected, the SyncDistributor selection process may need to rerun from the beginning.
- If one or more non-SyncDistributor devices are removed from the network, there may be no need reselection of SyncDistributors.
- If one or more SyncDistributors are removed from the network, the SyncDistributor selection process may need to rerun from the beginning.
- If one or more new radio devices join the network, additional SyncDistributor(s) may need to be selected. The method starts with the existing set of SyncDistributors and expands the set using the same way previously described until every new radio device either becomes a SyncDistributor or has at least one SyncDistributor in its neighborhood.

The set of SyncDistributors is responsible for transmitting beacons (i.e., messages for synchronization). To avoid collisions during such transmissions among the SyncDistributors, several techniques may be applied to coordinate the beacon transmissions. In an embodiment, every SyncDistributor may be assigned to a unique time slot for transmitting its respective beacon. In other words, the SyncDistributors can provide beacons in consecutive time slots.

In another embodiment, more than one SyncDistributor may be able to transmit beacons simultaneously (i.e., in the same assigned time slot), but only if the SyncDistributors are sufficiently far apart such that their radio signals will not affect each other. For example, if a first radio device can communicate with a second device directly, the second device is said to be one hop away from the first device, and thus the first radio device and the second radio device are said to be neighbors. If a first radio device cannot communicate with a second device directly but can communicate via a third device as a relay of radio messages, the second device is said to be two hops away from the first device. In general, if a first radio device cannot communicate with a second device directly, but can communicate via N devices as relays, the second device is said to be (N+1) hops away from the first device. Signals between radio devices three or more hops away should not interfere with each other. Therefore, if a first SyncDistributor is assigned to a time slot, a second SyncDistributor which is at least three hops away from the first SyncDistributor may be assigned to the same time slot.

In another embodiment, if a master SyncDistributor is assigned, the beacon transmission may start with the master SyncDistributor, i.e., a first time slot is assigned to the master SyncDistributor. A second time slot is assigned to a neighboring SyncDistributor of the master SyncDistributor. A third time slot is assigned to neighboring SyncDistributor(s) of any scheduled SyncDistributors, i.e., any SyncDistributor having an assigned time slot. More than one SyncDistributor may be assigned the third time slot as long as each SyncDistributor is at least three hops away from each other. This process continues until all SyncDistributors have been scheduled (i.e., have an assigned time slot). With selection of SyncDistributors, any radio device in the network should be able to hear one or more beacons from the SyncDistributors. A radio device uses the information in the beacon(s) to adjust a local system clock, as set forth in more detail in FIG. 21.

In a large/dense network with a lot (hundreds or thousands) of radio devices, a radio device may have many neighbors and may have difficulty storing, updating and communicating a complete list of neighbors. For example, if the previously proposed SyncDistributor selection method is running on server 641, the server needs to know the neighbor information of all devices. The neighbor information reported by each radio device may be limited by its storage space. To get a complete list of neighbor information, in one embodiment, server 641 may use the process of steps 622, 624 and 626. Server 641 sends out a request for neighbor list information to devices. Each radio device sends current neighbor list to the server 641. When server 641 receives the neighbor lists, the server needs to consolidate the neighbor information of neighbor lists from the different radio devices. For example, if device A's neighbor list does not have device B but device B's neighbor list has A, then B should be added to A's neighbor list.

Figure 20:
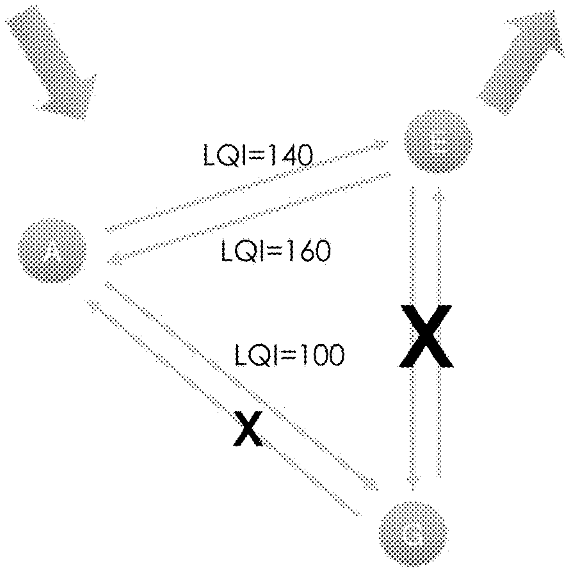
FIG. 20 depicts an illustrative embodiment of a method for identifying and updating neighbors of a radio device in accordance with various aspects described herein.

FIG. 20 depicts an illustrative embodiment of a method for identifying and updating neighbors of a radio device in accordance with various aspects described herein. As shown in FIG. 20, in an embodiment that determines complete neighbor information, the complete neighbor information is represented by a global adjacency matrix 645 comprises entries that represent the link quality index (LQI) of two devices if they are neighbors. Other data structures may be used to represent the complete neighbor information to define the topology of the wireless network. The server checks the consolidated adjacency matrix row by row, using devices coordinate information (x, y) to determine a maximum distance $d_{max}$ from neighbors to device A in current adjacency matrix.

By comparing $d_{max}$ to a threshold $d_{th}$ (e.g., $d_{th}$=100 m). Let $d_{rug}=\max(d_{max}, d_{th})$, where $d_{rug}$ is the ranging distance that device A should check for anchors inside of this distance, but not in its neighbor list (from the row of the adjacency matrix). Next, the server sends further requests to each device to do an additional ranging test, one by one. Then, each device that needs to do the additional ranging sends out a broadcast message and listens for any message(s) from other devices. When all devices complete the additional ranging, each device sends a second list (not original neighbor list) back to the server. The server consolidates the information from the second lists from different devices and creates an updated global adjacency matrix 647, accordingly.

In an example illustrated in FIG. 20, in global adjacency matrix 645, E and G are in the ranging distance of A but are not neighboring anchors of each other. A, E, G all have some anchors in their ranging distances, but not on their neighbor list. Next, the server requests A, E, G to do additional ranging. A, E, G broadcast according to the server request and listen to ranging messages from other anchors in this process. When all anchors are done, A, E, G send out the second neighbor list to the server according to received ranging messages. Then the server consolidates the lists from anchors and updates the global adjacency matrix 647.

Figure 21:
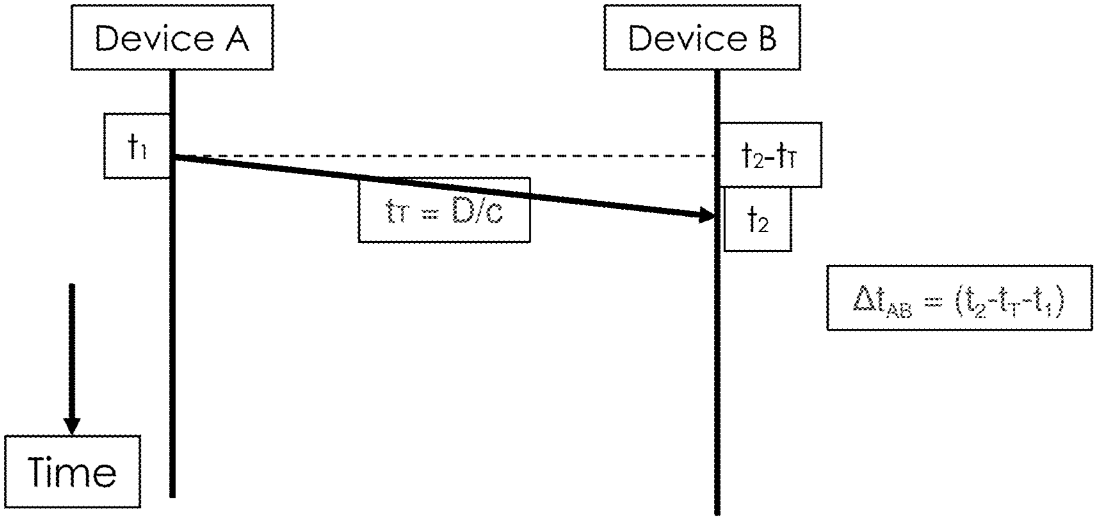
FIG. 21 depicts an illustrative embodiment of a method for synchronizing clocks using beacons in accordance with various aspects described herein.

FIG. 21 depicts an illustrative embodiment of a method for radio devices to synchronize their local clocks using beacons in accordance with various aspects described herein. The first scheduled SyncDistributor sends out a beacon with a timestamp generated from its local clock. The neighboring devices of the first scheduled SyncDistributor may hear this beacon. Next, the second, third, etc. scheduled SyncDistributors send out their beacons with a timestamp generated from their local clocks. Every device collects the overheard beacon(s) from its neighboring SyncDistributor(s) for a period of time and uses the collected timestamp information to adjust its local clock.

For example, a device calculates the difference between the received timestamp in a beacon, the timestamp from its local clock when receiving a beacon and the transmission duration of the beacon; the device may adjust its clock according to a combination function (e.g., average, max, min, median, etc.) of all timestamp differences from one or more beacons.

As illustrated in FIG. 21, device A and B are separated by a distance of D, so the transmission duration of a beacon between A and B is $t_T=D/c$, where c is the speed of light. Device A sends a beacon to device B at (local) time $t_1$. Device B receives the beacon from A at (local) time $t_2$, so B estimates A's transmission time at B's clock $t_2$-$t_T$. The clock difference between device A and B then is $\Delta t_{AB}=(t_2-t_T-t_1)$. Device B may collect all beacons from its neighbors and figure out the clock difference to each of them, e.g., $\Delta t_{AB}$, $\Delta t_{CB}$, $\Delta t_{DB}$, etc. Device B can adjust its clock based on the combination of these clock difference values.

Figure 22A:
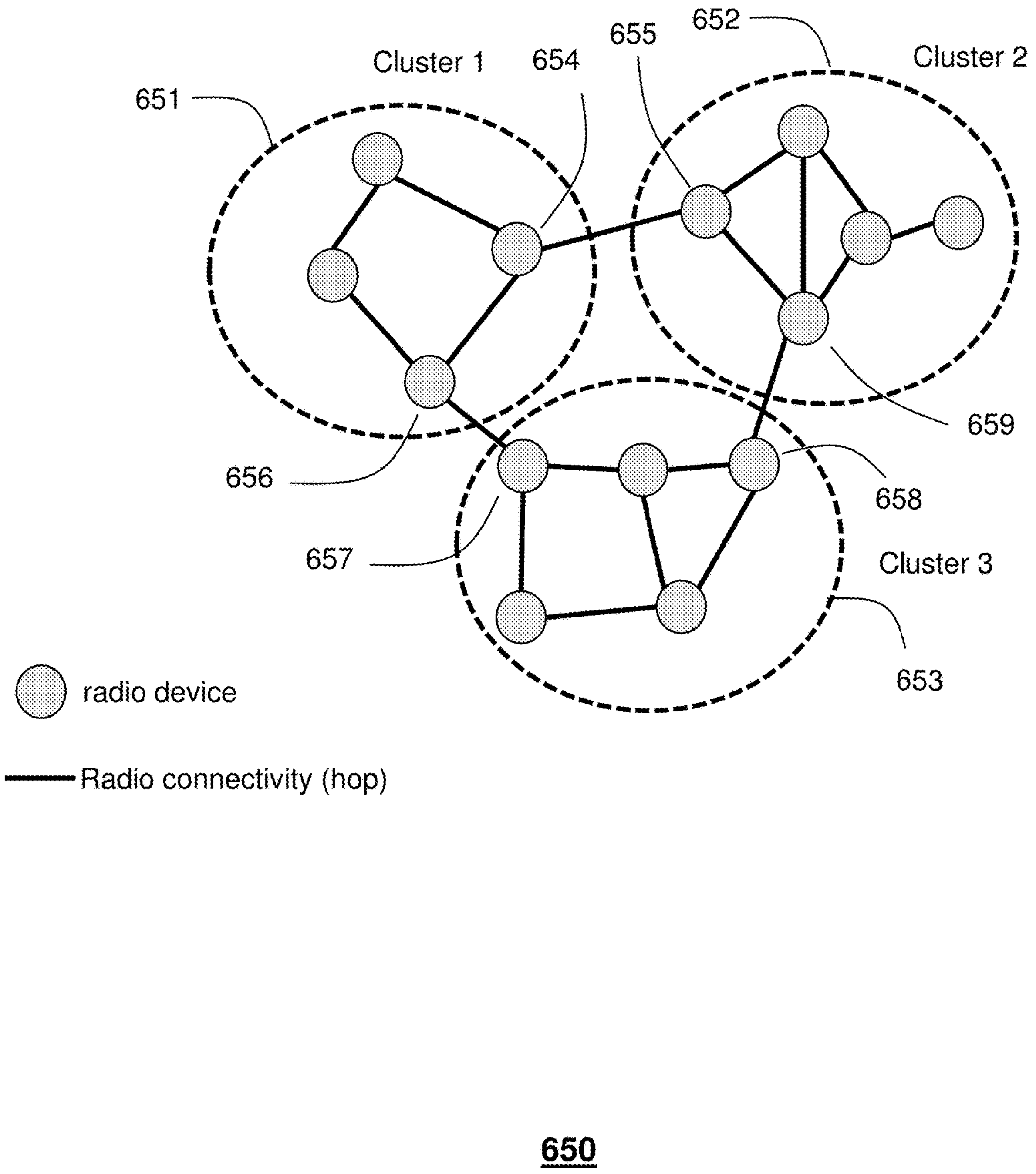
FIG. 22A is a block diagram of an example, non-limiting embodiments of a network topology comprising clusters in accordance with various aspects described herein.

FIG. 22A is a block diagram of an example, non-limiting embodiments of a network topology 650 comprising clusters in accordance with various aspects described herein. A cluster is defined as two or more radio devices that can communicate with each other and are organized into a group for supporting certain application(s). For example, the two or more radio devices are within a user-defined geographical boundary. As shown in FIG. 22A, cluster 1 comprises the four illustrated radio devices within user-defined boundary 651, cluster 2 comprises five radio devices within boundary 652, and cluster 3 comprises five radio devices within boundary 653. The devices inside a cluster usually have good connectivity to each other, i.e., a device to another device in the same cluster may have more than one route to communicate with each other.

A boundary radio device is defined as a radio device that is a neighbor to devices in more than one cluster. For example, as illustrated in FIG. 22A, node 654 in cluster 1 is a boundary radio device because node 654 is one hop away from some devices in its own cluster, cluster 1, as well as at least one node in another cluster, namely, node 655 in cluster 2. Similarly, node 656 in cluster 1 and node 657 in cluster 3 are neighbors; therefore, nodes 656 and 657 are boundary radio devices. Likewise, nodes 658 in cluster 3 and node 659 in cluster 2 are neighbors; therefore, nodes 658 and 659 are boundary radio devices. Notably, all radio devices in network topology 650 can communicate with each other via certain routes, even though they are located in one of three different clusters.

Figure 22B:
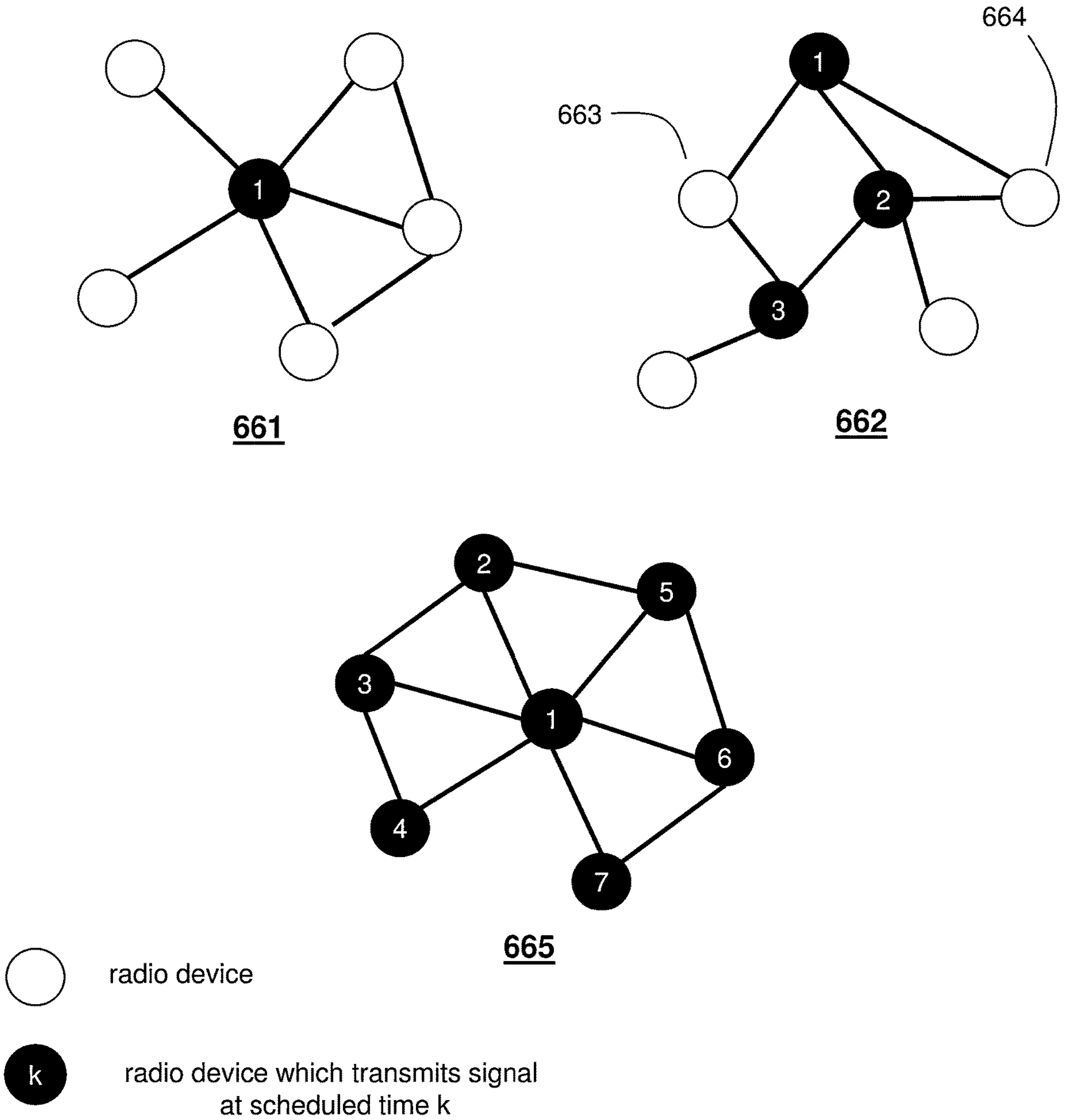
FIG. 22B is a block diagram of an example, non-limiting embodiments of synchronizing radio devices inside of a cluster in accordance with various aspects described herein.

FIG. 22B is a block diagram of an example, non-limiting embodiments of synchronizing radio devices inside of a cluster in accordance with various aspects described herein. To synchronize clocks between different radio devices, a radio device in a cluster may be instructed to transmit a signal with a transmission timestamp information of its local clock in the signal. An example is illustrated in network topology 661 of FIG. 22B. When other radio devices in the cluster receive this signal, they will extract and process the timestamp information in the signal and compare to their local clock to calculate any time difference. Processing the timestamp means that the receiving radio device may correct the timestamp information in the signal by considering the transmission time that the signal spent propagating through the air.

A radio device may get multiple signals from other radio devices and calculate corresponding (multiple) timestamp difference values, as illustrated by network topology 662 of FIG. 22B. For example, radio device 663 receives a timestamp in a signal from nodes 1 and 3, whereas radio device 664 receives a timestamp in a signal from nodes 1 and 2. Each radio device may use all or some or one of these timestamp difference values to adjust its local clock. See discussion related to FIG. 21 above.

There can be more than one device in the cluster transmitting the signal with transmission timestamp information. There are a couple of exemplary scenarios, such as:

- Every device in the cluster transmits a signal with its local timestamp information, as illustrated by network topology 665.
- A subset of devices in the cluster transmit signals with their local timestamp information, as illustrated in network topology 662. The subset comprises at least enough nodes such that the nodes in the network are no more than a hop away. See, e.g., the discussion of forming a SynchDistributors list of FIG. 18 above. However, there must also be at least one path through the network that can propagate timestamp information to all the clusters as well.

In both cases, every radio device in the cluster may receive signals from at least one device. If there is more than one device transmitting the signal with a transmission timestamp, the transmissions should be coordinated to avoid interference. In an embodiment, a radio device may use a certain well-known collision avoidance mechanism, e.g., ALOHA, carrier sense, multiple access (CSMA), etc., to initiate a transmission while minimizing the chance to collide with other signals. In another embodiment, radio devices are organized in a way that every device gets a scheduled time to transmit. In an embodiment, a radio device in the cluster may be responsible for generating this schedule for all devices that will be transmitting.

Figure 22C:
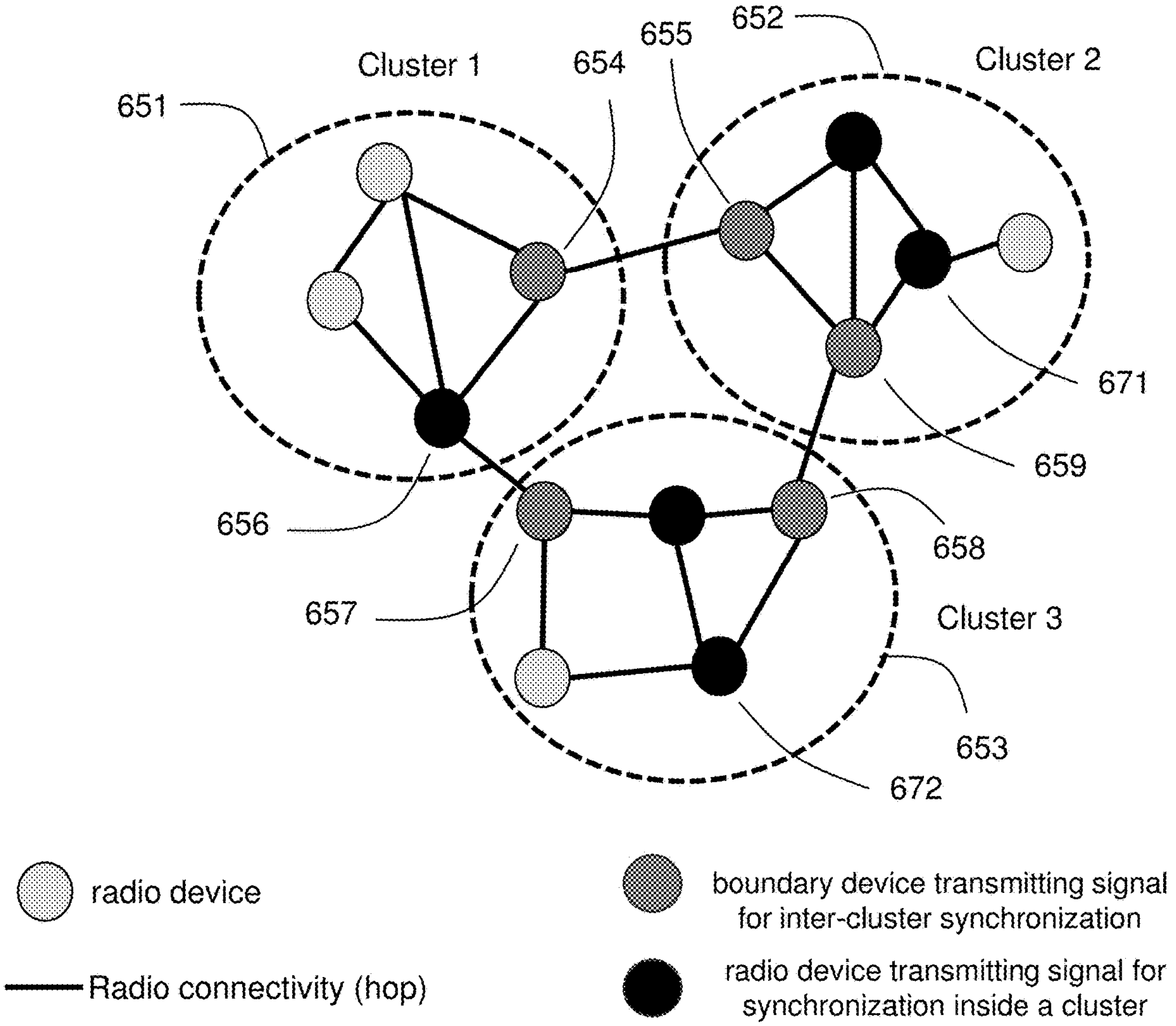
FIG. 22C is a block diagram of an example, non-limiting embodiment of devices synchronizing across clusters in accordance with various aspects described herein.

FIG. 22C is a block diagram of an example, non-limiting embodiment of devices synchronizing across clusters in accordance with various aspects described herein. As shown in topology 670, radio device 671 in cluster 2 and radio device 672 in cluster 3 each transmits a signal for synchronization of radio devices inside of their respective cluster, as described above in connection with FIG. 22B. With the presence of multiple clusters, an intra-cluster synchronization process will synchronize clocks in radio devices with devices in the same and different clusters. A subset of devices in each of the clusters may transmit signals bearing timestamp information. If there is more than one device transmitting the signal with a transmission timestamp, the transmissions should be coordinated to avoid interference, as described above in connection with FIG. 22B.

Additionally, some of the boundary radio devices that connect different clusters may also transmit signals with timestamp information from another cluster. The timestamp information from the device(s) of one cluster may be retransmitted (or "echoed") by one or more device(s) of another cluster that receive the signal. For example, boundary radio device 659 may receive timestamp information from radio device 671 in cluster 2 and echo the timestamp information to boundary radio device 658 in cluster 3. In turn, boundary radio device 658 may echo the timestamp information to radio devices in cluster 3. Hence, the timestamp information from another cluster may be used in a synchronization procedure inside a cluster, as described above in connection with FIG. 22B. In an embodiment, the receiving boundary radio device that echoes the timestamp information may also process the timestamp information, to adjust the timestamp for the time-of-flight delay or other delays before transmitting the echoed timestamp information.

Figure 22D:
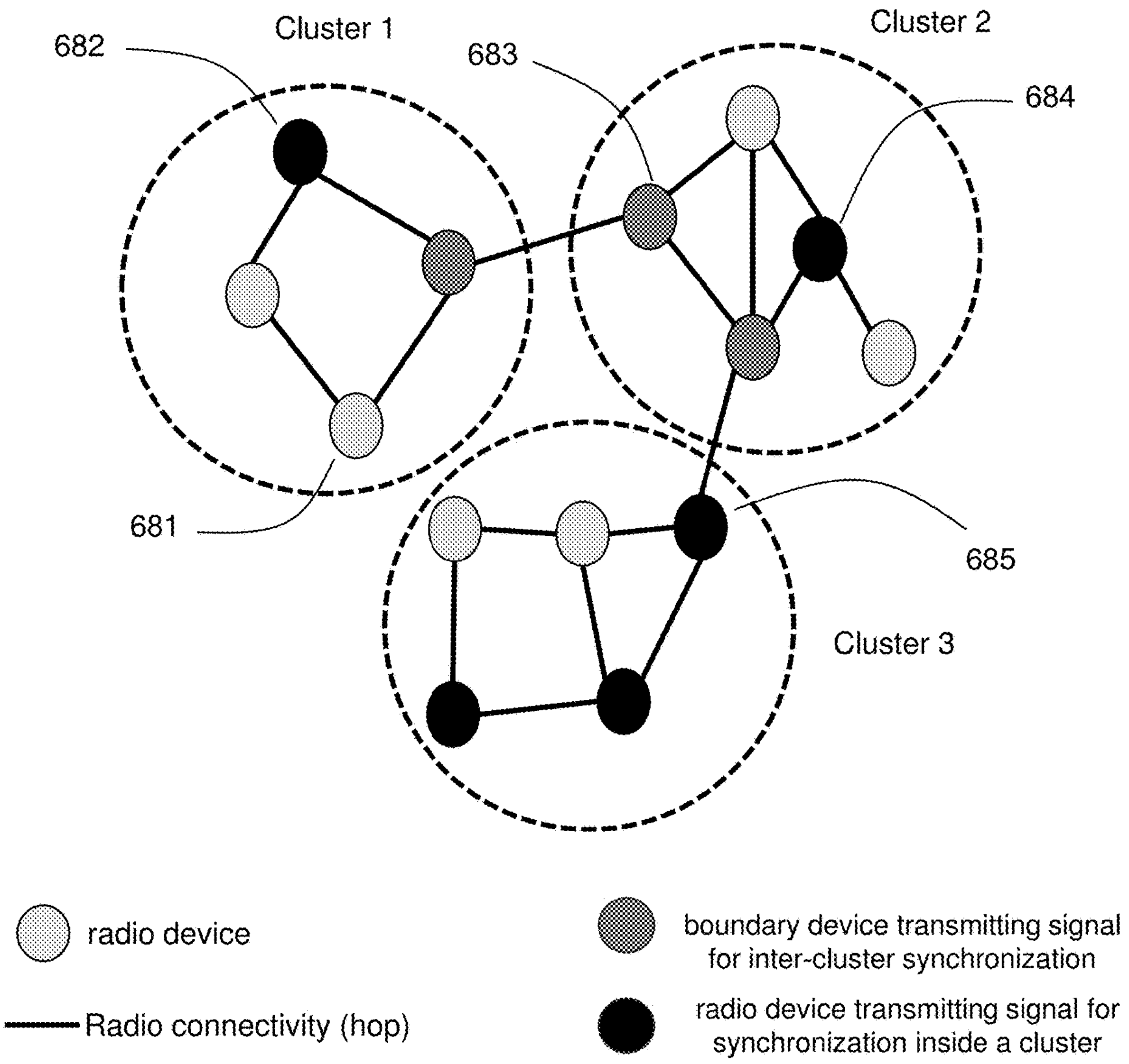
FIG. 22D is a block diagram of an example, non-limiting embodiment of illustrating changes to devices in a network of clusters in accordance with various aspects described herein.

FIG. 22D is a block diagram of an example, non-limiting embodiment illustrating changes to devices in a network 680 of clusters in accordance with various aspects described herein. Changes can happen in a cluster, for example, a new radio device may be added to the cluster, a radio device may be removed from the cluster, or a radio device may move such that its radio connectivity to other devices may have changed. If a new radio device has joined the cluster, such as radio device 681 in cluster 1 of FIG. 22D and can receive one or more signals with timestamp information from other radio devices, then the new device may use the received signals to adjust its clock to synchronize with other devices. No further changes may be necessary to any other radio devices in the cluster.

If a new device cannot hear any signal with timestamp information from other devices in the cluster, then one or more of its neighbor devices may need to start to transmit a signal with timestamp information, and the new device may use the received signal to adjust its clock to synchronize with other devices. See the subset of devices in the cluster transmitting signals requirements above in connection with FIG. 22B, network topology 662.

If a radio device removed from the cluster is not a radio device that transmits a signal with timestamp information, the removal of the device may have no impact of synchronization on other devices in the cluster, provided connectivity is unaffected, such as the removal of radio device 681. The neighbor device(s) of the removed radio device should use a signal from other transmitting radio device(s) to adjust its clock. If some of the neighbor device(s) of the removed device, such as radio device 682 being removed, cannot receive a timestamp signal from another device, then some additional devices in the cluster may need to start to transmit a signal with timestamp information such that each neighbor device of the removed device can receive at least one signal from another device.

However, if the removed radio device causes the network to no longer be connected, such as removal of radio device 683 which makes the network disjointed, i.e., forms two separate networks, then the remaining radio devices in each network may need to be re-clustered and then synchronized again, as set forth above. In contrast, if the removed radio device does not affect network connectivity, but affects the connectivity of a cluster (i.e., remaining devices in a cluster are not connected to each other anymore), such as removal of radio device 684, then remaining radio devices in the cluster may need to be re-clustered and then synchronized again, as set forth above.

If a radio device is moved from a first cluster to a second cluster, this operation is equivalent to removing the device from the first cluster and then adding the device to the second cluster. The processes for removing a device and adding a device to the network that are described above should be followed.

If the radio device is moved inside a cluster without affecting the connectivity between its cluster and other cluster(s), such as moving radio device 681 within cluster 1, then the movement of the radio device may affect the synchronization of devices in its cluster. The process of synchronizing described above in connection with FIG. 22B may be applied to the cluster after the movement of the device.

If a boundary radio device is moved inside of its cluster, which also affects the connectivity of its cluster to other clusters, such as radio device 683, then two possible scenarios occur. Either the device is a device that transmits a signal with timestamp information, or merely passes along timestamp information (like radio device 683). If the boundary radio device is a device that transmits a signal with timestamp information, such as radio device 685, then its movement may affect synchronization among clusters. After it has been moved, then the inter-cluster synchronization processes described in connection with FIG. 22C should be performed, followed by the cluster synchronization processes of FIG. 22B. If the moving boundary radio device does not transmit a signal with timestamp information, then only the cluster synchronization processes described in connection with FIG. 22B need to be performed.

Figure 23:
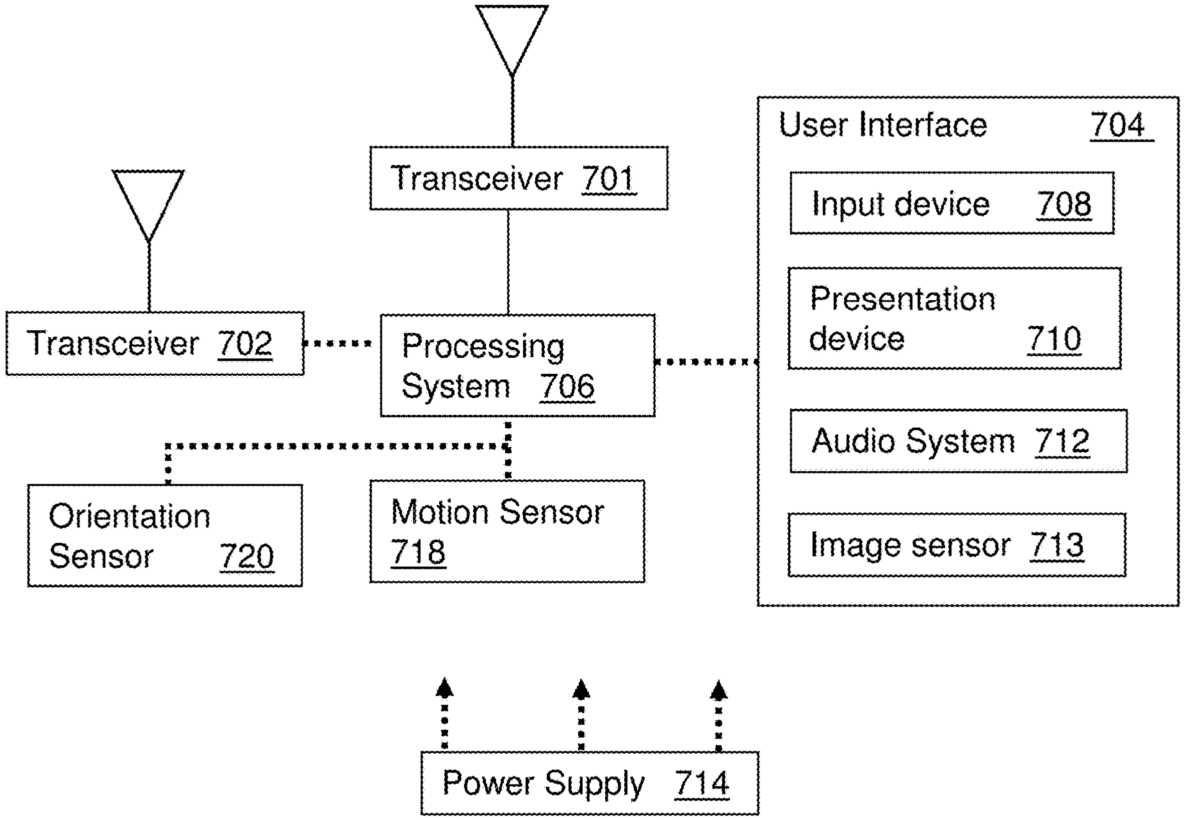
FIG. 23 is a block diagram of an example, non-limiting embodiments of a communication device in accordance with various aspects described herein.

FIG. 23 is a block diagram of an example, non-limiting embodiments of a communication device 700 in accordance with various aspects described herein. Communication device 700 can serve in whole or in part as an illustrative embodiment of a mobile tag 101, 201 and an anchor 102, 104, 106, 108, 204 as depicted in FIGS. 1-7, and can be configured to perform in whole or in part portions of methods of FIGS. 8, 17-21 and 22A-22D.

In an embodiment, communication device 700 can comprise a first wireless transceivers 701, a user interface (UI) 704, a power supply 714, and a processing system 706 for managing operations of the communication device 700. In another embodiment, communication device 700 can further include a second wireless transceiver 702, a motion sensor 718, and an orientation sensor 720. The first wireless transceiver 701 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 702 can be configured to support wireless access technologies such as Bluetooth®, ZigBee®, or Wi-Fi (Bluetooth® and ZigBee® are trademarks registered by the Bluetooth® Special Interest Group and the ZigBee® Alliance, respectively). The second wireless transceiver 702 can be utilized to conserve power and offload messaging between communication devices by utilizing narrow band signals such as Bluetooth®, ZigBee®, or Wi-Fi, instead of ultra-wideband signals. One or both wireless transceivers 701, 702 can also be used for obtaining a strength indicator (RSSI). One or both wireless transceivers 701, 702 can also be equipped with multiple antennas and one or more phase detectors to determine angle of arrival of wireless signals and thereby an orientation of the communication device 700 (e.g., mobile tag 101) relative to another communication device 700 (e.g., anchor 204).

The UI 704 can include an input device 708 that provides at least one of one or more depressible buttons, a tactile keypad, a touch-sensitive keypad, or a navigation mechanism such as a roller ball, a joystick, or a navigation disk for manipulating operations of the communication device 700. The input device 708 can be an integral part of a housing assembly of the communication device 700 or an independent device operably coupled thereto by a tethered wireline interface (such as a USB cable) or a wireless interface supporting for example Bluetooth©. The UI 704 can further include a presentation device 710. The presentation device 710 can include a vibrator to generate haptic feedback, an LED (Light Emitting Diode) configurable by the processing system 706 to emit one or more colors, and/or a monochrome or color LCD (Liquid Crystal Display) or OLED (Organic LED) display configurable by the processing system to present alphanumeric characters, icons or other displayable objects.

The UI 704 can also include an audio system 712 that utilizes audio technology for conveying low volume audio (for proximity listening by a user) and/or high-volume audio (for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images in a vicinity of the communication device 700. The camera can be used for performing facial recognition and user ID recognition that can be combined with embodiments of the subject disclosure.

The power supply 714 can utilize common power management technologies such as replaceable and rechargeable batteries, supply regulation technologies, and/or charging system technologies for supplying energy to the components of the communication device 700 to facilitate portable applications. Alternatively, or in combination, the charging system can utilize external power sources such as DC power supplied over a physical interface such as a USB port or other suitable tethering technologies.

The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (in degrees, minutes, or other suitable orientation metrics). In some embodiments, the orientation sensor 720 can replace a need for utilizing multiple antennas with the first and/or second wireless transceivers 701, 702 and a phase detector for performing angle of arrival measurements. In other embodiments, the function of the orientation sensor 720 can be combined with an angle of arrival measurement performed with multiple antennas with the first and/or second wireless transceivers 701, 702 and a phase detector.

The processing system 706 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 23 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings.

The communication device 700 as described herein can operate with more or less of the circuit components shown in FIG. 23. These variant embodiments can be used in one or more embodiments of the subject disclosure.

Figure 24:
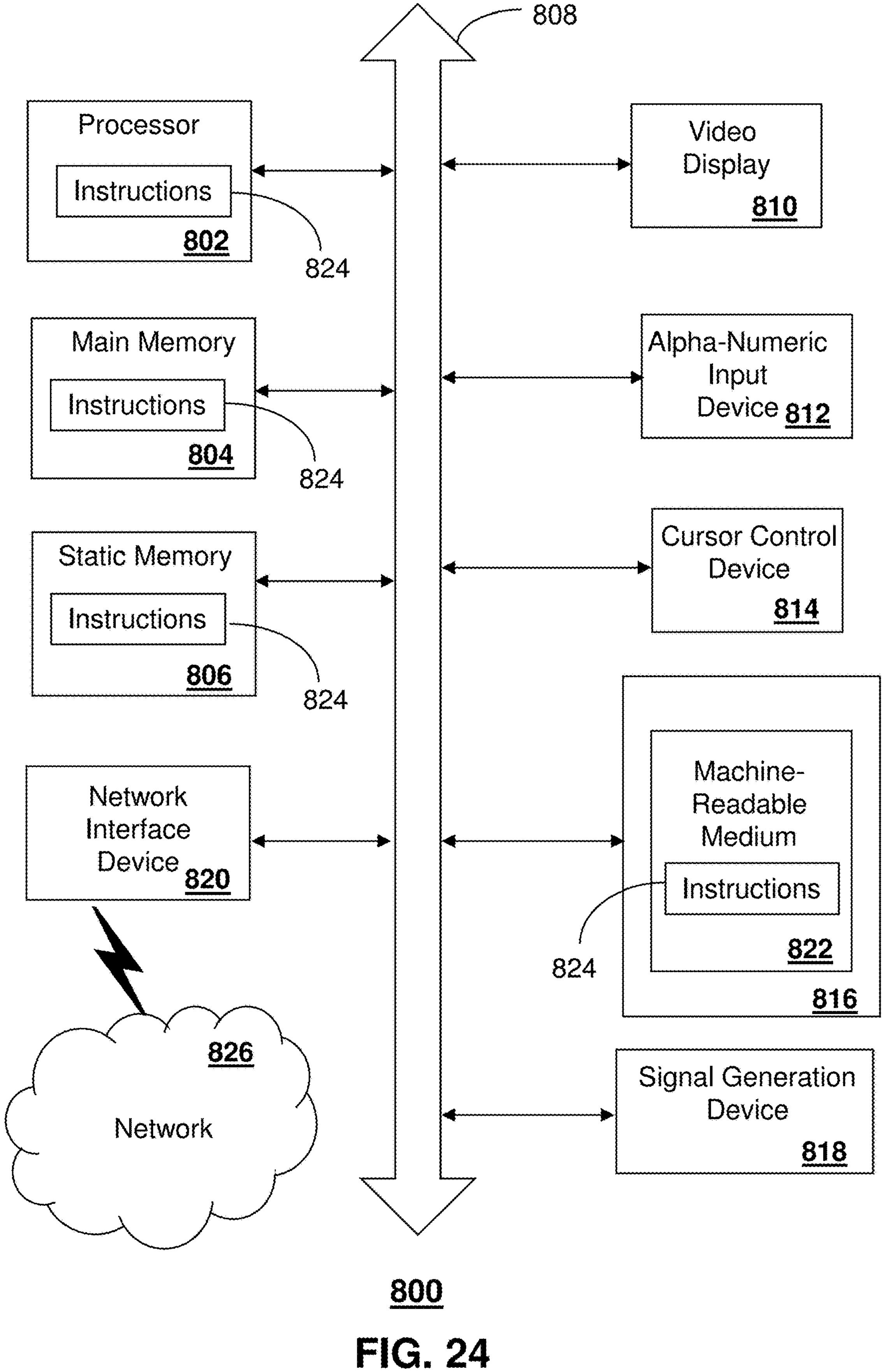
FIG. 24 is a block diagram of an example, non-limiting embodiments of a computing system in accordance with various aspects described herein.

FIG. 24 depicts an exemplary diagrammatic representation of a machine in the form of a computing system 800 within which a set of instructions, when executed, may cause the machine to perform any one or more of the methods described above. One or more instances of the machine can operate, for example, as the computing system referred to in methods of FIGS. 8, 17-21 and 22A-22D. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid-state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

One or more aspects of the subject disclosure include a device having a processing system including a processor; and a memory that stores executable instructions that, when executed by the processing system, facilitate performance of operations, including determining complete neighbor information for a plurality of radio devices in a wireless network, wherein the complete neighbor information denotes neighboring radio devices; including a first radio device of the plurality of radio devices in a list of radio devices for delivering beacons; determining a set of radio devices in the plurality of radio devices that are not neighboring radio devices of every radio device in the list; responsive to an existence of at least one radio device in the set, adding an additional radio device from the plurality of radio devices to the list, wherein the additional radio device has at least one neighboring radio device in the list and has at least one neighboring radio device in the set; and repeating the determining the set step and the adding step until the set is empty.

One or more aspects of the subject disclosure include a non-transitory, machine-readable medium with executable instructions that, when executed by a processing system including a processor operating from a device, facilitate performance of operations, including determining complete neighbor information for a plurality of radio devices in a wireless network, wherein the complete neighbor information denotes neighboring radio devices; establishing a backbone list including radio devices for delivering beacons, wherein the backbone list includes a first radio device of the plurality of radio devices; determining a set of radio devices in the plurality of radio devices that are not neighboring radio devices of every radio device in the backbone list; adding an additional radio device from the plurality of radio devices to the backbone list responsive to an existence of at least one radio device in the set, wherein the additional radio device has at least one neighboring radio device in the backbone list and has at least one neighboring radio device in the set; and repeating the determining the set step and the adding step until the set is empty.

One or more aspects of the subject disclosure include a method of determining, by a processing system, complete neighbor information for a plurality of radio devices in a wireless network, wherein the complete neighbor information denotes neighboring radio devices; establishing, by the processing system, a backbone list including radio devices that provide beacons, wherein the backbone list includes a first radio device of the plurality of radio devices; determining, by the processing system, a set of radio devices in the plurality of radio devices that are not neighboring radio devices of every radio device in the backbone list; adding, by the processing system, an additional radio device from the plurality of radio devices to the backbone list responsive to an existence of at least one radio device in the set, wherein the additional radio device has at least one neighboring radio device in the backbone list and has at least one neighboring radio device in the set; and repeating, by the processing system, the determining the set step and the adding step until the set is empty.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:

a processing system including a processor; and a memory that stores executable instructions that, when executed by the processing system, facilitate performance of operations by the processing system, the operations comprising:

determining that a boundary radio device in a second cluster of a wireless network is a neighbor to radio devices in more than one cluster;

determining that a first radio device in a first cluster is the neighbor of the boundary radio device;

sending a first instruction to the boundary radio device to explicitly initiate transmission of first timestamp information received from a third radio device in the second cluster to the first radio device, wherein the first instruction specifies collision avoidance protocols to ensure reliable transmission of the first timestamp information;

sending a second instruction to the first radio device to transmit the first timestamp information to radio devices in the first cluster using a defined time-slot-based signaling collision avoidance mechanism;

responsive to the determining that the boundary radio device is the neighbor, causing the boundary radio device to echo the first timestamp information from the second cluster to the first cluster.

2. The device of claim 1, wherein the boundary radio device and the first radio device process the first timestamp information to adjust the first timestamp information for time-of-flight delay.

3. The device of claim 2, wherein the operations further comprise:

sending a third instruction to the first radio device to transmit second timestamp information received from any radio device in the first cluster to the boundary radio device; and sending a fourth instruction to the boundary radio device to transmit the second timestamp information to other radio devices in the second cluster.

4. The device of claim 3, wherein the first radio device coordinates transmission of the first timestamp information with the other radio devices in the first cluster.

5. The device of claim 1, wherein the operations further comprise sending a fifth instruction to the third radio device to transmit the first timestamp information.

6. The device of claim 5, wherein the fifth instruction is sent to every radio device in the second cluster.

7. The device of claim 5, wherein the fifth instruction is sent to radio devices in the second cluster that are included in a SynchDistributors list.

8. The device of claim 7, wherein the first instruction is sent to every boundary radio device in the wireless network.

9. The device of claim 8, wherein the processing system comprises a plurality of processors operating in a distributed processing environment.

10. A non-transitory, machine-readable medium comprising executable instructions that, when executed by a processing system including one or more processors operating from one or more devices, cause performance of operations by the processing system, the operations comprising:

identifying a boundary radio device in a second cluster of a wireless network is a neighbor to radio devices in more than one cluster;

determining whether a first radio device in a first cluster is the neighbor of the boundary radio device;

sending a first instruction to the first radio device to explicitly initiate transmission of first timestamp information received from the boundary radio device to radio devices in the first cluster responsive to determining that the first radio device is the neighbor of the boundary radio device, wherein the first instruction specifies collision avoidance protocols to ensure reliable transmission of the first timestamp information; and responsive to the determining that the first radio device is the neighbor of the boundary radio device, causing the boundary radio device to echo the first timestamp information from the second cluster to the first cluster.

11. The non-transitory, machine-readable medium of claim 10, wherein the boundary radio device and the first radio device process the first timestamp information to adjust the first timestamp information for delay.

12. The non-transitory, machine-readable medium of claim 11, wherein the operations further comprise:

sending a second instruction to the first radio device to transmit second timestamp information received from any radio device in the first cluster using a defined time-slot-based signaling collision avoidance mechanism to the boundary radio device; and sending a third instruction to the boundary radio device to transmit the second timestamp information to other radio devices in the second cluster.

13. The non-transitory, machine-readable medium of claim 12, wherein the first radio device coordinates transmission of the first timestamp information with the other radio devices in the first cluster.

14. The non-transitory, machine-readable medium of claim 10, wherein the operations further comprise sending a fourth instruction to a third radio device to transmit the first timestamp information.

15. The non-transitory, machine-readable medium of claim 10, wherein the first instruction is sent to every boundary radio device in the wireless network.

16. The non-transitory, machine-readable medium of claim 10, wherein the processing system comprises a plurality of processors operating in a distributed processing environment.

17. A method, comprising:

determining, by a processing system comprising a processor, a boundary radio device in a second cluster of a wireless network that is a neighbor to radio devices in more than one cluster;

determining, by the processing system, a first group of radio devices in a first cluster that are neighbors of boundary radio device;

responsive to the determining that the boundary radio device is the neighbor, causing the boundary radio device to echo first timestamp information from the second cluster to the first cluster;

sending, by the processing system, a first instruction to the first group of radio devices to explicitly initiate transmission of the first timestamp information received from the radio devices in other clusters to radio devices in the first cluster, wherein the first instruction specifies collision avoidance protocols to ensure reliable transmission of the first timestamp information; and sending, by the processing system, a second instruction to the radio devices in the other clusters to transmit second timestamp information received from other radio devices in the other clusters to the first group of radio device in the first cluster that are respective neighbors using a defined time-slot-based signaling collision avoidance mechanism.

18. The method of claim 17, further comprising coordinating, by the processing system, transmissions of the first timestamp information by the first group of radio devices in the first cluster.

19. The method of claim 17, further comprising determining whether a first radio device in the first group of radio devices is the neighbor of the boundary radio device.

20. The method of claim 19, further comprising sending a third instruction to the boundary radio device to transmit the second timestamp information to other radio devices in the other clusters.

* * * * *